US008177678B2

(12) United States Patent
Tange

(10) Patent No.: US 8,177,678 B2
(45) Date of Patent: May 15, 2012

(54) MULTISTAGE TRANSMISSION

(75) Inventor: Hiroshi Tange, Fuji (JP)

(73) Assignee: Jatco Ltd, Fuji-shi (JP)

( * ) Notice: Subject to any disclaimer, the term of this patent is extended or adjusted under 35 U.S.C. 154(b) by 375 days.

(21) Appl. No.: 12/539,169

(22) Filed: Aug. 11, 2009

(65) Prior Publication Data
US 2010/0184557 A1    Jul. 22, 2010

(30) Foreign Application Priority Data

Aug. 29, 2008 (JP) ................................. 2008-221116
Sep. 2, 2008 (JP) ................................. 2008-224307

(51) Int. Cl.
*F16H 15/46* (2006.01)
(52) U.S. Cl. .......................................... 476/49; 476/72
(58) Field of Classification Search ................ 476/6, 49, 476/72, 73
See application file for complete search history.

(56) References Cited

U.S. PATENT DOCUMENTS

| 1,251,784 A * | 1/1918 | Joslin ............................... 476/33 |
| 1,814,165 A * | 7/1931 | Jacobsen ........................ 476/49 |
| 3,143,895 A * | 8/1964 | Robie ........................... 474/143 |
| 3,347,106 A * | 10/1967 | Edouard .......................... 476/7 |
| 3,871,239 A | 3/1975 | Steinhagen |
| 4,344,333 A * | 8/1982 | Mikina .......................... 476/12 |

FOREIGN PATENT DOCUMENTS

| GB | 392917 | 5/1933 |
| JP | 03-002954 U | 1/1991 |

OTHER PUBLICATIONS

H. Tange, U.S. PTO Office Action, U.S. Appl. No. 12/539,146, dated Jan. 19, 2012, 13 pages.
U.S. Appl. No. 12/539,118, filed Aug. 11, 2009, Tange.
U.S. Appl. No. 12/539,146, filed Aug. 11, 2009, Tange.

* cited by examiner

*Primary Examiner* — William C Joyce
(74) *Attorney, Agent, or Firm* — Foley & Lardner LLP

(57) ABSTRACT

In a multistage transmission, a pair of pressure rollers is provided to be movable along a two-axes connecting line of input and output shafts within a disk overlapping area of input and output disks, and configured to sandwich the input and output disks while applying contact pressure from the outside disk faces at a position corresponding to a required transmission ratio. A plurality of ridged portions, formed on each of the input and output disks, are configured such that the entire length of the two-axes connecting line is divided into an input-side driving radius and an output-side driving radius, both determined based on the required transmission ratio, and that an apex of a selected input-side ridged portion and an apex of a selected output-side ridged portion, both determined based on the required transmission ratio, are arranged to oppose each other on the two-axes connecting line.

6 Claims, 10 Drawing Sheets

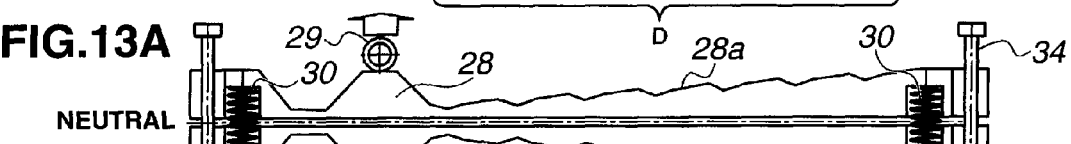
FIG.13A NEUTRAL
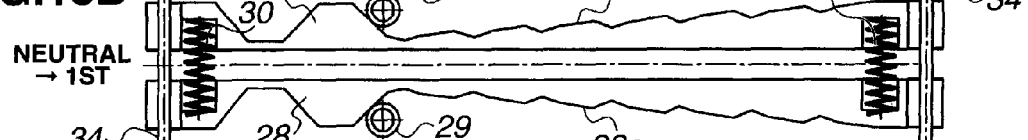
FIG.13B NEUTRAL → 1ST
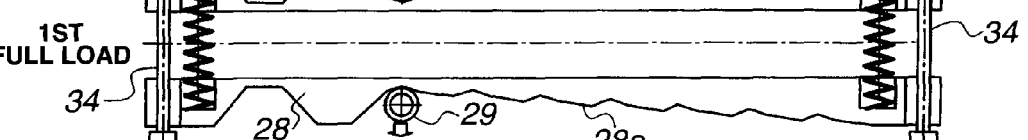
FIG.13C 1ST FULL LOAD
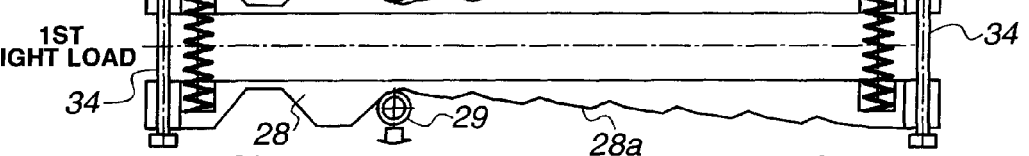
FIG.13D 1ST LIGHT LOAD
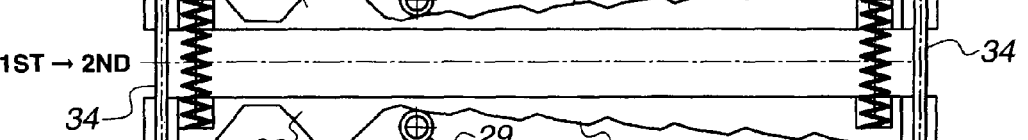
FIG.13E 1ST → 2ND
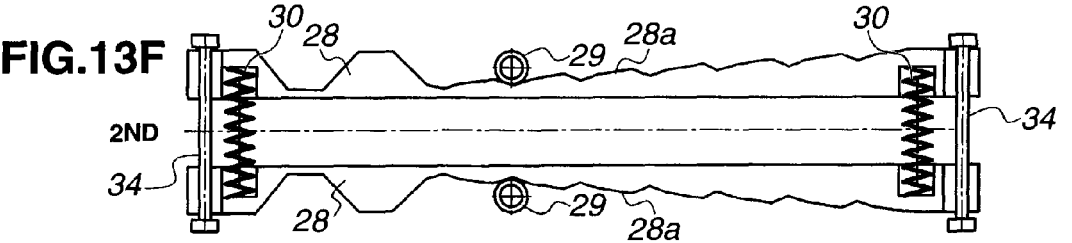
FIG.13F 2ND

MULTISTAGE TRANSMISSION

TECHNICAL FIELD

The present invention relates to a multistage transmission, which can be applied to automotive vehicles, and specifically to a multistage transmission employing a friction-gearing mechanism in which power is transmitted from thin input disks to thin output disks by bringing power-transmission portions of the input and output disks into contact with each other, utilizing elastic deformation of the disks under pressure.

BACKGROUND ART

As a transmission with a friction-gearing mechanism, a so-called "Beier" power transmission (or a so-called "Beier" variator) employing a mechanical drive, which drive includes a plurality of cone disks (input disks) and a plurality of flange disks (output disks), is generally known. One such "Beier" power transmission has been disclosed in FIGS. 3-4 in Japanese published Utility Model application No. 3-2954 (hereinafter referred to as "JU3-2954").

In the "Beier" power transmission as disclosed in JU3-2954, power, inputted into an input shaft, is transmitted via gears (e.g., an input-shaft gear, splined-shaft gears, and intermediate idler gears each meshing with the input-shaft gear and the associated splined-shaft gear) to a plurality of splined shafts (e.g., three splined shafts), and further delivered equally to a plurality of stacks of cone disks (e.g., three stacks of cone disks) arranged to surround the central flange-disk stack. The cone disks of each stack and the central flange disks are arranged alternately with each other, such that the cone disk is interleaved between the associated two adjacent flange disks. Also provided is an automatic contact-pressure regulation mechanism, which is comprised of a face cam (i.e., a loading cam) and a spring. The face cam and the spring are both installed on an output shaft, in a manner so as to maintain the loading force (the contact pressure) on the disks at all times. The interleaved cone disk sets are coated with oil (traction oil) when operating. At their points of contact, axial pressure applied by the flange disks compresses the oil film, increasing its viscosity. The cone disks transmit motion to the flange disks without metal-to-metal contact by shearing the molecules of the high-viscosity oil film. A speed-change link mechanism is also provided to cause a downshift or an upshift by moving the cone disks radially toward the flange disks (output speed decrease) or away from the flange disks (output speed increase).

SUMMARY OF THE INVENTION

However, the "Beier" power transmission as disclosed in JU3-2954 has a multiple-disk-drive structure that each cone disk is interleaved between two adjacent outer peripheral flanged portions of the associated two flange disks. Thus, the distance between the axis of the output shaft and the point of contact of the flanged portion of each of the flange disks of the central flange-disk stack, simply called a "driving radius of the output side", is fixed. On the other hand, the distance between the axis of the splined shaft on which one stack of cone disks is mounted and the point of contact of each of the movable cone disks, simply called a "driving radius of the input side", is variable. Under a specific state where the center distance between the axis of the splined shaft and the axis of the output shaft becomes maximum with radially outward movement of the cone disks away from the flange disks, generally, the ratio of the variable driving radius (or the effective contacting radius) of the input side to the fixed driving radius of the output side becomes approximately "1". As the cone disks move radially toward the flange disks from the previously-noted specific state, the ratio of the variable driving radius of the input side to the fixed driving radius of the output side tends to gradually reduce. In such a case, the speed ratio of output speed to input speed can be set to "1" or less, but the speed ratio exceeding "1", in other words, an overdrive mode cannot be obtained. That is, the settable speed-ratio range is narrow. Thus, it would be desirable to provide a friction-disk-drive equipped transmission configured to produce a wide range of speed ratios, including a speed-increase ratio (an overdrive mode and/or a super-overdrive mode) as well as a speed-reduction ratio.

Usually, the "Beier" power transmission as disclosed in JU3-2954, adopts a three-stack layout that three stacks of cone disks are arranged to surround the central flange-disk stack, in order to avoid the transmission from being stuck in a certain speed ratio, thus ensuring a stable operation of the multiple disk drive. The three stacks of cone disks are supported by respective splined shafts, equidistant-spaced from each other in the circumferential direction of the central flange-disk stack. The three splined shafts are movable radially toward or away from the output shaft through the speed-change link mechanism. Component parts, constructing the speed-change link mechanism, are laid out within three limited spaces defined among the three stacks of cone disks and the central flange-disk stack. Hence, this leads to a very complicated linkage design, increased number of component parts, and increased weight of the three stacks of cone disks, each of which cone disks is tapered so that the thickness decreases from the root to the tip. The disadvantages of the "Beier" power transmission as disclosed in JU3-2954 are the increased manufacturing costs, the difficulty of reducing the number of component parts constructing the multiple disk drive, and the difficulty of achieving the compactness in the multiple disk drive.

Furthermore, according to the multiple-disk contact structure of the "Beier" power transmission as disclosed in JU3-2954, the slightly-tapered flat side faces of each cone disk are sandwiched between two adjacent outer peripheral flanged portions (two opposed axially-protruded portions) of the associated two flange disks with axial pressure, while applying the axial pressure (contact pressure) on the disks. Thus, the shape of the contact area of a torque-transmission contacting portion of the cone-disk flat side face and the flange-disk axially-protruded portion, tends to become a substantially oval shape or a substantially elliptic shape, elongated in the circumferential direction of the central flange-disk stack. Owing to the circumferentially-elongated torque-transmission contacting portion, i.e., owing to the substantially elliptic shape of the two contacting surfaces at the point of contact, a relative-velocity difference between the two circumferentially-enlarged contacting surfaces (at the point of contact), circumferentially deviated from the center of the torque-transmission contacting portion, occurs. Such a relative-velocity difference leads to the problem of undesired galling contact, thus causing an increased spin loss in transmitted torque.

It is, therefore, in view of the previously-described disadvantages of the prior art, an object of the invention to provide a multistage transmission configured to enable (i) a clutch function, by which switching between a torque-transmission enabling state and a torque-transmission disabling state occurs, as well as (ii) a shifting function having a higher degree of freedom of speed ratios (i.e., a wide range of speed ratios including a speed-increase ratio (an overdrive mode and/or a super-overdrive mode) as well as a speed-reduction ratio), while achieving reduced or suppressed manufacturing costs and a more compact and light-weight friction-disk-drive construction, and also configured to reduce a spin loss in transmitted torque at a torque-transmission contacting portion corresponding to each of finite shift stages (finite transmission ratios).

In order to accomplish the aforementioned and other objects of the present invention, a multistage transmission comprises an input shaft connected to a prime mover, and supported by a transmission-case member, an output shaft arranged parallel to the input shaft and supported by the transmission-case member, an input disk which is installed on the input shaft and whose outer peripheral edge is arranged in close proximity to the output shaft, an output disk which is installed on the output shaft and whose outer peripheral edge is arranged in close proximity to the input shaft, and a pair of pressure-application devices configured to be movable along a two-axes connecting line, interconnecting an axis of the input shaft and an axis of the output shaft, within a disk overlapping area that the input and output disks overlap with each other, and further configured to sandwich both outside faces of the input and output disks while applying contact pressure from the outside disk faces at a position corresponding to a required transmission ratio, for creating a torque-transmission contacting portion by elastic deformation of the input and output disks, the input disk having a plurality of input-side concentric ridged portions formed on its disk face and arranged concentrically with the axis of the input shaft as concentric circles with the same center, which center is identical to the axis of the input shaft, and respective different radii from the axis of the input shaft, the output disk having a plurality of output-side concentric ridged portions formed on its disk face and arranged concentrically with the axis of the output shaft as concentric circles with the same center, which center is identical to the axis of the output shaft, and respective different radii from the axis of the output shaft, and the plurality of input-side concentric ridged portions and the plurality of output-side concentric ridged portions being configured such that the entire length of the two-axes connecting line is divided into an input-side driving radius and an output-side driving radius, both determined based on the required transmission ratio of a plurality of transmission ratios, and that an apex of a selected one of the input-side concentric ridged portions, determined based on the required transmission ratio, and an apex of a selected one of the output-side concentric ridged portions, determined based on the required transmission ratio, are arranged to oppose each other on the two-axes connecting line.

The other objects and features of this invention will become understood from the following description with reference to the accompanying drawings.

BRIEF DESCRIPTION OF THE DRAWINGS

FIGS. 13A-13F are top plan views illustrating the positional relationship between the template pair and the cam follower pair in the presence of switching from N to D range in the automotive automatic transmission system to which the multi-disk type multistage transmission unit of the embodiment can be applied, FIG. 13A showing the position of the cam follower pair relative to the template pair during N-range selection, FIG. 13B showing the relative position of the cam follower pair during switching from N to D-range 1st-speed gear position, FIG. 13C showing the relative position of the cam follower pair at full-load 1st-speed gear position, FIG. 13D showing the relative position of the cam follower pair at light-load 1st-speed gear position, FIG. 13E showing the relative position of the cam follower pair during switching from 1st-speed to 2nd-speed gear position, and FIG. 13F showing the relative position of the cam follower pair at 2nd-speed gear position.

DESCRIPTION OF THE PREFERRED EMBODIMENTS

Figure 1:
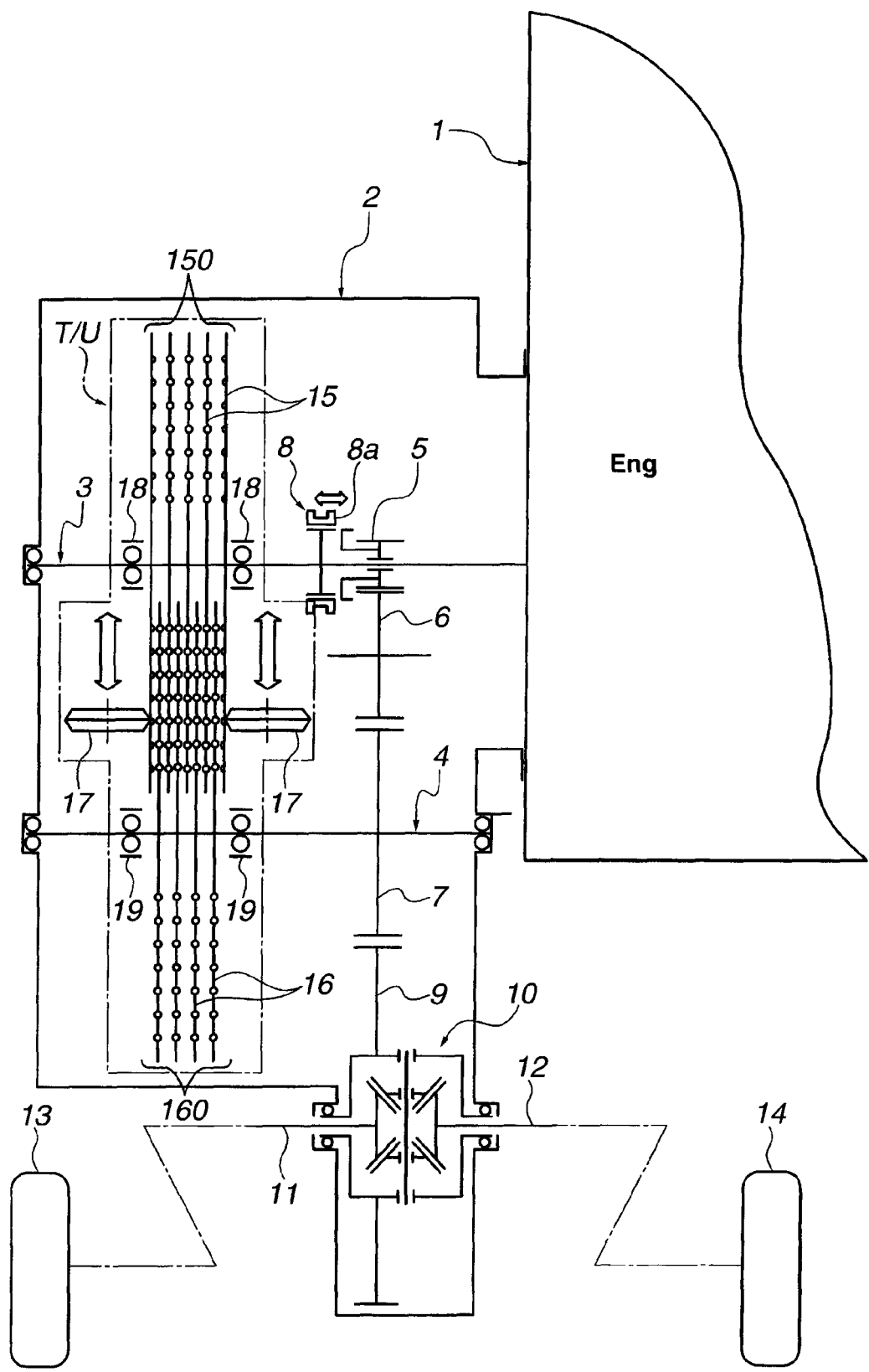
FIG. 1 is a system diagram illustrating an automotive automatic transmission system to which an embodiment of a multi-disk type multistage transmission unit can be applied.

Referring now to the drawings, particularly to FIG. 1, a multi-disk type multistage transmission unit T/U of the embodiment is exemplified in an automatic transmission system of an automotive vehicle.

As shown in FIG. 1, in addition to multi-disk type multistage transmission unit T/U of the embodiment, the automotive automatic transmission system also includes an engine 1 (a prime mover), a transmission case 2, an input shaft 3, an output shaft 4, a reverse gear 5, a reverse idler gear 6, an output gear 7, a synchronizing device 8, a final gear 9, a differential unit 10, left and right axle driveshafts 11, 12, and left and right drive road wheels 13, 14.

The previously-noted multi-disk type multistage transmission unit T/U is comprised of a primary disk stack 150, a secondary disk stack 160, a pair of pressure rollers 17, 17 (serving as a pair of pressure-application devices or pressure-application means), a pair of input-shaft support frames 18, 18, and a pair of output-shaft support frames 19, 19. Primary disk stack 150 is constructed by a plurality of input disks 15, whereas secondary disk stack 160 is constructed by a plurality of output disks 16. Input-shaft support frames 18, 18 are configured to rotatably support input shaft 3, whereas output-shaft support frames 19, 19 are configured to rotatably support output shaft 4.

That is, as seen in FIG. 1, the automotive automatic transmission system, to which multi-disk type multistage transmission unit T/U of the embodiment can be applied, has a triaxial structure comprised of the axis of input shaft 3, the axis of output shaft 4, and the axis common to left and right axle driveshafts 11-12. The automotive automatic transmission system is configured to achieve seven forward gear positions automatically by means of multi-disk type multistage transmission unit T/U during the selection of the D (drive) range, and also configured to achieve one reverse gear position by synchromesh action of synchronizing device 8 during the selection of the R (reverse) range.

The overall construction of multi-disk type multistage transmission unit T/U of the embodiment will be hereinafter described in detail by reference to the general perspective view of FIG. 2 and the cross section of multi-disk type multistage transmission unit T/U shown in FIG. 3 and taken along the line A-A in FIG. 2.

Figure 2:
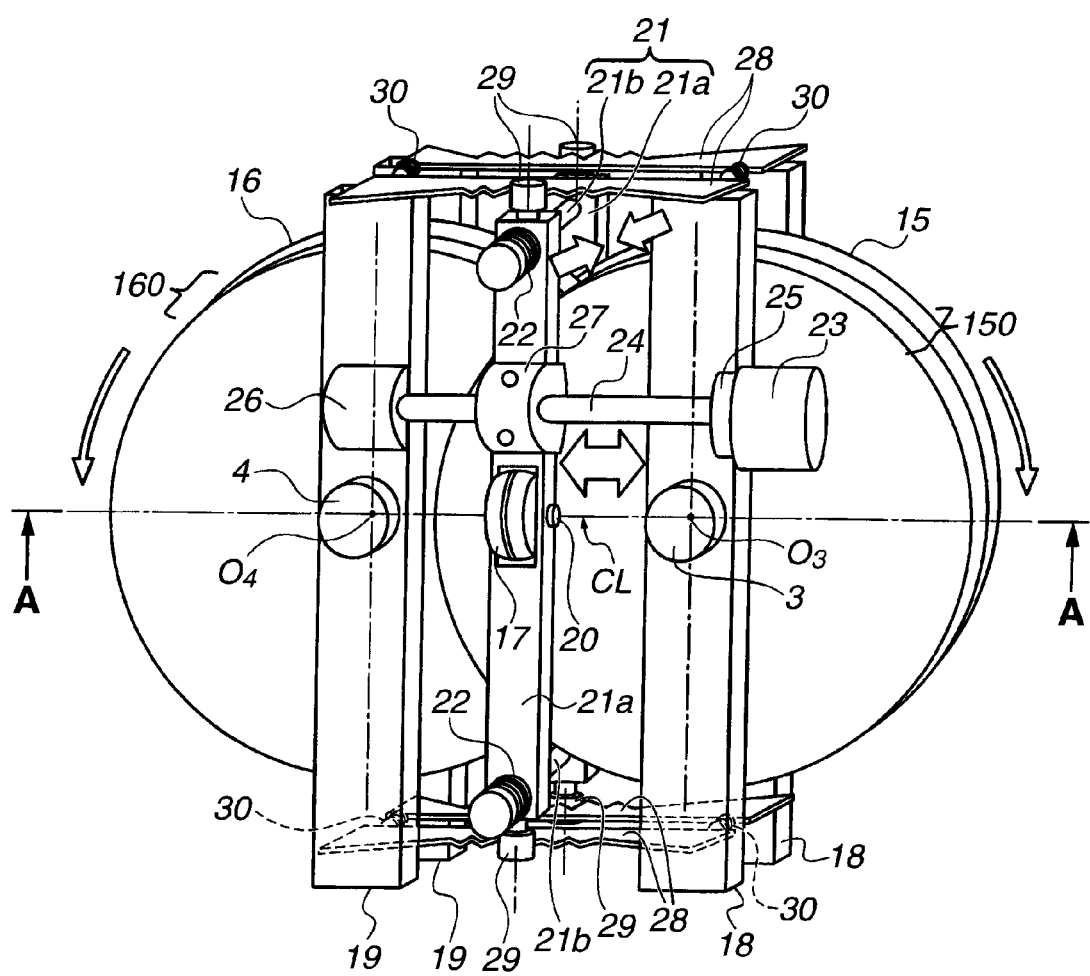
FIG. 2 is a general perspective view illustrating the multi-disk type multistage transmission unit of the embodiment.

As seen from the perspective view of FIG. 2, multi-disk type multistage transmission unit T/U of the embodiment includes input shaft 3, output shaft 4, primary disk stack 150 (constructed by plural input disks 15), secondary disk stack 160 (constructed by plural output disks 16), pressure rollers 17, 17, input-shaft support frames 18, 18 (a transmission-case member), output-shaft support frames 19, 19 (the transmission-case member), and a pair of pressure-roller pivots 20, 20 for respective pressure rollers 17, 17.

Input shaft 3 is connected to engine 1. Both ends of input shaft 3 are rotatably supported by respective input-shaft support frames 18, 18. Input shaft 3 is equipped with primary disk stack 150 constructed by plural input disks 15, whose outer peripheral edges are arranged in close proximity to output shaft 4, and which are axially equidistant-spaced from each other (see FIGS. 2-3).

Output shaft 4 is arranged parallel to input shaft 3. Both ends of output shaft 4 are rotatably supported by respective output-shaft support frames 19, 19. Output shaft 4 is equipped with secondary disk stack 160 constructed by plural output disks 16, whose outer peripheral edges are arranged in close proximity to input shaft 3, and which are axially equidistant-spaced from each other (see FIGS. 2-3).

A disk overlapping area is defined by interposing output disks 16 into respective axial clearance spaces, defined by plural input disks 15 arranged adjacent to each other and axially uniformly spaced from each other. Within the disk overlapping area, primary disk stack 150 and secondary disk stack 160 overlap with each other. As viewed in the axial direction of the axis "$O_3$" of input shaft 3 (or the axis "$O_4$" of output shaft 4), assume that a line segment interconnecting these axes "$O_3$" and "$O_4$" and perpendicular to both of the axes "$O_3$" and "$O_4$" is defined as a two-axes connecting line "CL". Pressure rollers 17, 17 are laid out and configured to be movable along two-axes connecting line "CL" within the previously-noted disk overlapping area. The position obtained as a result of translating motion of the movable pressure roller pair 17, 17 along two-axes connecting line "CL" is determined based on a required transmission ratio (or a required speed ratio). Pressure rollers 17, 17 are further configured to sandwich both side faces of primary and secondary disk stacks 150 and 160 while applying axial pressure or contact pressure (two opposed contact forces) from the outside faces of primary and secondary disk stacks 150 and 160 at the position obtained as a result of translating motion of the movable pressure roller pair 17, 17 along two-axes connecting line "CL" and corresponding to the required transmission ratio, for creating torque-transmission contacting portions by elastic deformation of both of primary and secondary disk stacks 150 and 160.

The pressure roller pair 17, 17 is configured to rotate in synchronism with rotary motion of primary and secondary disk stacks 150 and 160 while sandwiching both sides of primary and secondary disk stacks 150 and 160 by applying the contact pressure (two opposed contact forces) from the outside faces of primary and secondary disk stacks 150 and 160. Under these conditions, the left-hand pressure roller 17 is kept in rolling contact with the outside face of the left-hand side input disk 15 (viewing FIG. 1), whereas the right-hand pressure roller 17 is kept in rolling contact with the outside face of the right-hand side input disk 15. Furthermore, the pressure roller pair 17, 17 is configured and installed to permit the rotation axis of the pressure roller pair 17, 17, that is, the axis of each of pressure-roller pivots 20, 20 to be aligned with two-axes connecting line "CL" when there is no change in the required transmission ratio (that is, when there is no shift-stage change) and thus there is no occurrence of translating motion of the pressure roller pair 17, 17 along two-axes connecting line "CL". The pressure roller pair 17, 17 is further configured and installed to permit an infinitesimal tilting motion of the rotation axis of the pressure roller pair 17, 17 with respect to two-axes connecting line "CL", whose tilting direction depends on the direction of translating motion of the pressure roller pair 17, 17 along two-axes connecting line "CL" when there is a change in the required transmission ratio (that is, when there is a shift-stage change) and thus there is an occurrence of translating motion of the pressure roller pair 17, 17 along two-axes connecting line "CL". That is, as shown in FIG. 3, pressure-roller pivots 20, 20, on which respective pressure rollers 17, 17 are rotatably supported, are loosely fitted to a movable frame 21 (described later) with an intended slight free play (or an intended slight clearance) that permits the previously-noted infinitesimal tilting motion of the rotation axis of the pressure roller pair 17, 17.

Figure 3:
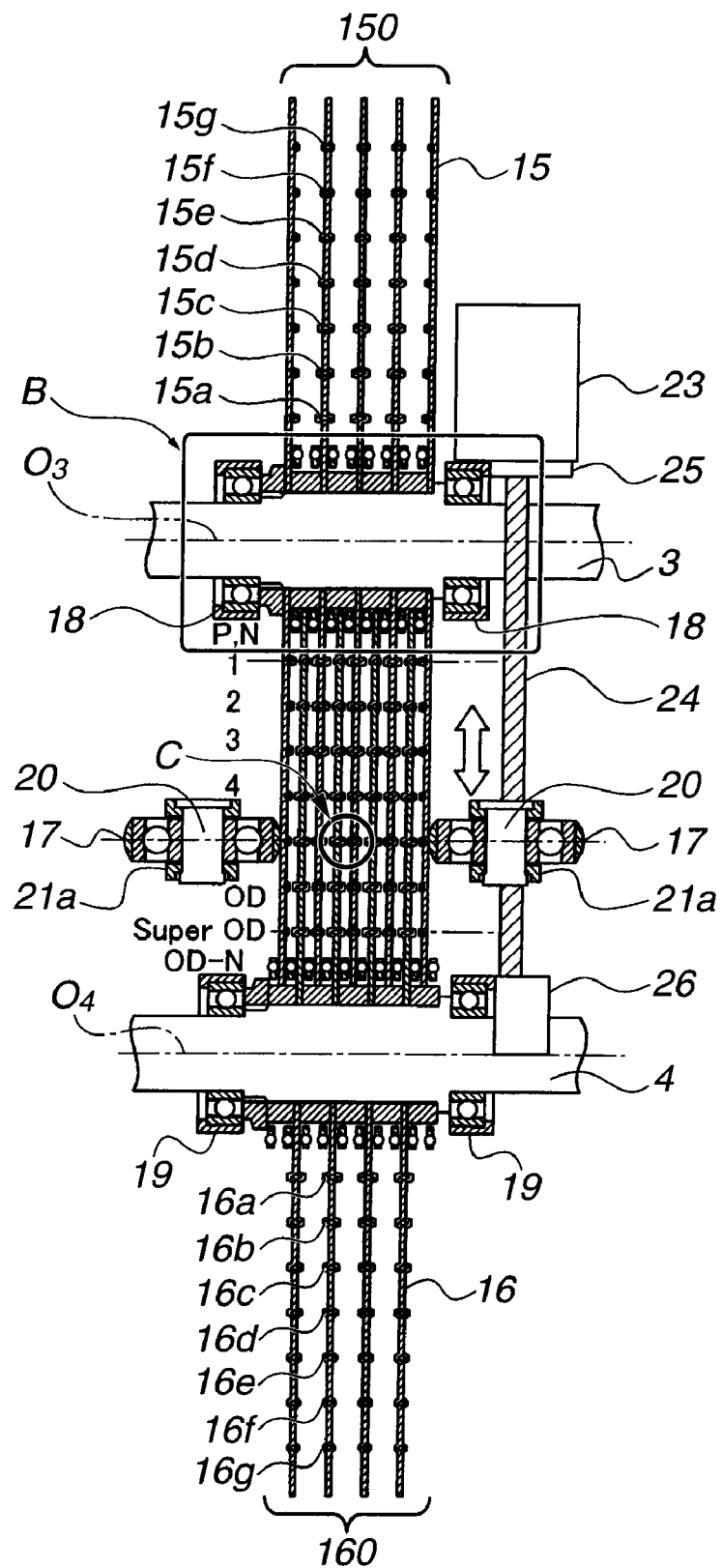
FIG. 3 is a cross section of the multi-disk type multistage transmission unit of the embodiment, taken along the line A-A in FIG. 2.

As best seen in FIG. 3, each of input disks 15 has a plurality of input-side concentric ridged portions 15a, 15b, 15c, 15d, 15e, 15f, and 15g formed on its disk face and arranged concentrically with the axis "$O_3$" of input shaft 3 as concentric circles with the same center, which center is identical to the axis "$O_3$" of input shaft 3, and respective different radii from the axis "$O_3$". In a similar manner, each of output disks 16 has a plurality of output-side concentric ridged portions 16a, 16b, 16c, 16d, 16e, 16f, and 16g formed on its disk face and arranged concentrically with the axis "$O_4$" of output shaft 4 as concentric circles with the same center, which center is identical to the axis "$O_4$" of output shaft 4, and respective different radii from the axis "$O_4$". Each of the radii of input-side concentric ridged portions 15a-15g and each of the radii of output-side concentric ridged portions 16a-16g are preset such that the entire length of two-axes connecting line "CL" is divided into an input-side radius and an output-side radius, both determined based on a required transmission ratio of a plurality of transmission ratios.

As seen in FIG. 3, when contact pressure (two opposed contact forces), applied to the outside faces of primary and secondary disk stacks 150 and 160 by the pressure roller pair 17, 17, is removed, input-side concentric ridged portions 15a-15g and output-side concentric ridged portions 16a-16g are kept axially spaced from each other a very small clearance space (a given clearance space). The pressure roller pair 17, 17 is configured to create or exert contact pressure (two opposed contact forces) between the two opposing apexes of (i) a selected one of input-side concentric ridged portions 15a-15g, determined based on a required transmission ratio of a plurality of finite transmission ratios ranging from a first-speed gear position (a lowest-speed shift stage) to a seventh-speed gear position (a highest-speed shift stage) and (ii) a selected one of output-side concentric ridged portions 16a-16g, determined based on the required transmission ratio. Concretely, a first-speed shift stage is achieved by a combination of input-side concentric ridged portion 15a and output-side concentric ridged portion 16g. A second-speed shift stage is achieved by a combination of input-side concentric ridged portion 15b and output-side concentric ridged portion 16f. A third-speed shift stage is achieved by a combination of input-side concentric ridged portion 15c and output-side concentric ridged portion 16e. A fourth-speed shift stage is achieved by a combination of input-side concentric ridged portion 15d and output-side concentric ridged portion 16d. A fifth-speed shift stage is achieved by a combination of input-side concentric ridged portion 15e and output-side concentric ridged portion 16c. A sixth-speed shift stage (an overdrive shift stage) is achieved by a combination of input-side concentric ridged portion 15f and output-side concentric ridged portion 16b. A seventh-speed shift stage (a super-overdrive shift stage) is achieved by a combination of input-side concentric ridged portion 15g and output-side concentric ridged portion 16a.

The pressure roller pair 17, 17 is rotatably supported on movable frame 21, which frame is movable along the direction of two-axes connecting line "CL". Movable frame 21 is configured to permit a biasing force Fd, produced by a mechanical spring device 22 (serving as a biasing device or biasing means) installed on movable frame 21, to act as the contact pressure (two opposed contact forces) applied to the torque-transmission contacting portions.

That is, as best seen in FIG. 2, movable frame 21 is laid out to be movable along the direction of two-axes connecting line "CL" in such a manner as to surround the periphery of the disk overlapping area that primary and secondary disk stacks 150 and 160 overlap with each other. Movable frame 21 is comprised of a pair of opposed roller-support frame portions 21a, 21a, facing the respective outside faces of primary and secondary disk stacks 150 and 160, and a pair of connecting frame portions 21b, 21b. A first one of connecting frame portions 21b, 21b is provided to interconnect upper ends (viewing FIG. 2) of roller-support frame portions 21a, 21a. The second connecting frame 21b is provided to interconnect lower ends (viewing FIG. 2) of roller-support frame portions 21a, 21a. The previously-noted pressure-roller pivots 20, 20 are installed on respective roller-support frame portions 21a, 21a by loose fit (clearance fit) so as to permit an infinitesimal tilting motion of each of pivots 20, 20 with respect to two-axes connecting line "CL". In the shown embodiment, mechanical spring device 22 is comprised of coned disk springs. The coned disk springs are installed on respective connecting frame portions 21b, 21b, for producing biasing force (spring force) Fd in a direction that reduces or narrows the distance between the two opposed roller-support frame portions 21a, 21a. Movable frame 21 is configured to be movable in the direction of two-axes connecting line "CL" by means of a ball-screw motion-transmitting mechanism. The ball-screw motion-transmitting mechanism is comprised of a ball-screw shaft (simply, a screw shaft or a worm shaft) whose axis is arranged parallel to two-axes connecting line "CL", a first screw-shaft support structure 25, a second screw-shaft support structure 26, and a ball-screw structure 27. As can be seen in FIGS. 2-3, first screw-shaft support structure 25 is installed on input-shaft support frame 18, second screw-shaft support structure 26 is installed on output-shaft support frame 19, and ball-screw structure 27 is installed on roller-support frame portion 21a. Although it is not clearly shown in FIG. 2, ball-screw structure 27 includes a substantially cylindrical, movable ball nut and recirculating balls interposed between the worm teeth of screw shaft 24 and guide grooves cut in the inner peripheral wall surface of the movable ball nut. Both ends of screw shaft 24 are rotatably supported by first and second screw-shaft support structures 25-26. The intermediate portion of screw shaft 24 is threadably engaged with the movable ball nut of ball-screw structure 27. The right-hand axial end (viewing FIG. 2) of screw shaft 24, rotatably supported by first screw-shaft support structure 25, is connected to the output shaft of a speed-change actuator 23 (simply, an actuator), such as a stepping motor. Hence, movable frame 21 can move along the direction of two-axes connecting line "CL" via the previously-discussed ball-screw motion-transmitting mechanism, by operating (rotating) actuator 23 (e.g., a stepping motor).

The magnitude of contact pressure (two opposed contact forces having the same magnitude and the same line of action but different direction), which is exerted or applied for creating the torque-transmission contacting portions of primary and secondary disk stacks 150 and 160 via the pressure roller pair 17, 17, is appropriately adjusted by means of a biasing-force adjustment device, serving as biasing-force adjustment means (described hereunder).

The biasing-force adjustment device is comprised of a pair of biasing-force adjusting templates 28, 28 having respective cam contour surfaces 28a, 28a cut out or formed to adjust the magnitude of biasing force (spring force) Fd produced by mechanical spring device 22 (coned disk spring) and a pair of cam followers 29, 29 being cammed-connection with respective cam contour surfaces 28a, 28a of the template pair 28, 28 and configured to be movable along the respective cam contour surfaces. As can be seen from the top plan view of FIG. 6, cam contour surfaces 28a, 28a of the template pair 28, 28 are substantially mirror-symmetrical with respect to the geometric centerline of the biasing-force adjustment device. Also provided is a mechanical spring device, which is comprised of a pair of coil springs 30, 30 (such as compression coil springs) interposed between templates 28, 28 whose inside faces are opposed to each other, so as to produce or exert a biasing force (a spring force) Fs between the template pair 28, 28 in the direction that templates 28, 28 are forced apart from each other. In the shown embodiment, as clearly shown in FIG. 2, the first template pair 28, 28 spring-loaded by the first coil spring pair 30, 30 and the first cam follower pair 29, 29 are laid out at the upper end of movable frame 21, whereas the second template pair 28, 28 spring-loaded by the second coil spring pair 30, 30 and the second cam follower pair 29, 29 are laid out at the lower end of movable frame 21. In more detail, cam followers 29, 29 of the first pair are rotatably attached to the respective upper ends of the two opposed roller-support frame portions 21a, 21a, and also cam followers 29, 29 of the second pair are rotatably attached to the respective lower ends of the two opposed roller-support frame portions 21a, 21a. The cam follower pair 29, 29 is configured such that biasing force Fd, produced by mechanical spring device 22 (coned disk spring), is exerted on the contacting surfaces between the template cam-contour surface pair 28a, 28a and the cam follower pair 29, 29. Hence, a biasing force F, applied to each of rollers 17, 17 (constructing the pressure roller pair) for producing the contact pressure applied to primary and secondary disk stacks 150 and 160 for creating the torque-transmission contacting portions, can be defined or regarded as a difference (Fd−Fs) between biasing force Fd produced by mechanical spring device 22 (coned disk spring) and biasing force Fs exerted between the template pair 28, 28 by the coil spring pair 30, 30. Biasing force F, applied to each of pressure rollers 17, 17, in other words, the biasing-force difference F (=Fd−Fs) between biasing forces Fd and Fs can be adjusted by properly setting the shape of the cam contour surface pair 28a, 28a of the template pair 28, 28.

The construction (or the structure) of input and output disks 15 and 16 of multi-disk type multistage transmission unit T/U of the embodiment will be hereinafter described in detail by reference to the enlarged cross section shown in FIG. 4 and taken within the rectangular section B of FIG. 3 and the enlarged cross section shown in FIG. 5 and taken within the circular section C of FIG. 3.

Input shaft 3, which is equipped with primary disk stack 150, has a spacing structure mounted on its outer periphery, for keeping the inner peripheral ends of input disks 15 and the outer peripheral edges of output disks 16 interposed into respective axial clearance spaces, which spaces are defined by input disks 15 adjacent to each other, at regular intervals. In a similar manner, output shaft 4, which is equipped with secondary disk stack 160, has a spacing structure mounted on its outer periphery, for keeping the outer peripheral edges of input disks 15 and the inner peripheral ends of output disks 16 interposed into respective axial clearance spaces, which spaces are defined by input disks 15 adjacent to each other, at regular intervals.

Figure 4:
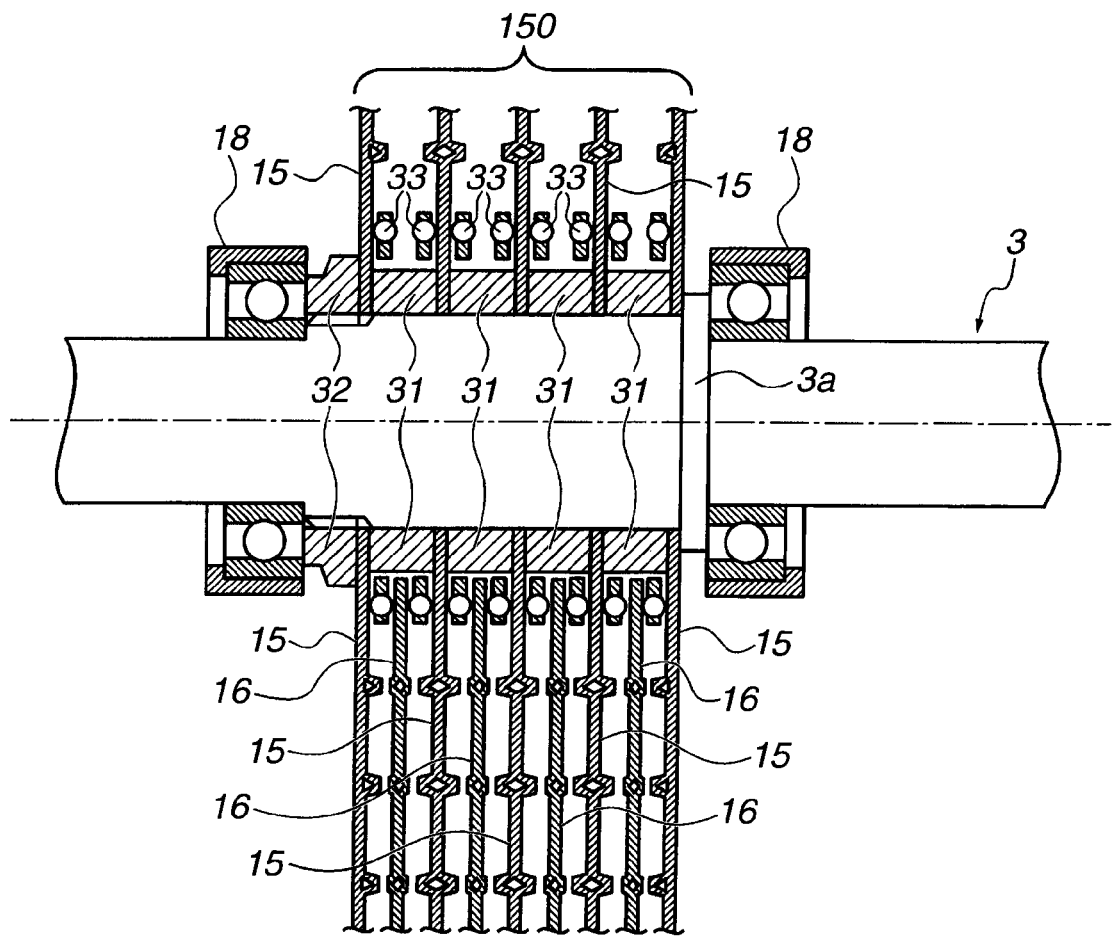
FIG. 4 is an enlarged cross section illustrating a spacing structure between input and output disks of the multi-disk type multistage transmission unit of the embodiment, taken within the rectangular section B of FIG. 3.

As clearly shown in FIG. 4, the spacing structure, mounted on the outer periphery of input shaft 3, includes a plurality of collars 31 interposed into respective input-disk basal-end axial clearance spaces defined by the outer periphery of input shaft 3 and the inner peripheral ends of input disks 15 adjacent to each other, for arraying plural input disks 15 at regular intervals. The spacing structure mounted on input shaft 3 further includes a fastening nut 32 threadably engaged with an external screw-threaded portion formed on input shaft 3 and a stopper flange 3a integrally formed with input shaft 3 and facing the right-hand axial end (viewing FIG. 4) of primary disk stack 150. Plural input disks 15 are fixedly connected onto the outer periphery of input shaft 3, while being kept axially at regular intervals, by fastening the inner peripheral ends of input disks 15 and plural collars 31 together with fastening nut 32, which nut is screwed onto the input-shaft external screw-threaded portion from the left-hand axial end. The spacing structure mounted on input shaft 3 still further includes a pair of ball-and-cage assemblies 33, 33 located on the outer periphery of collar 31 and interposed between the two adjacent inner peripheral ends of input disks 15. In the shown embodiment, four pairs of ball-and-cage assemblies (33,33; 33,33; 33,33; 33,33) are provided for keeping respective outer peripheral edges of output disks 16 axially at regular intervals.

In a similar manner, as seen in FIG. 3, the spacing structure, mounted on the outer periphery of output shaft 4, includes a plurality of collars arranged on both sides of secondary disk stack 160 as well as in output-disk basal-end axial clearance spaces defined by the outer periphery of output shaft 4 and the inner peripheral ends of output disks 16 adjacent to each other, for arraying plural output disks 16 at regular intervals. The spacing structure mounted on output shaft 4 further includes a fastening nut threadably engaged with an external screw-threaded portion formed on output shaft 4 and a stopper flange integrally formed with output shaft 4 and facing the right-hand axial end (viewing FIG. 3) of secondary disk stack 160. Plural output disks 16 are fixedly connected onto the outer periphery of output shaft 4, while being kept axially at regular intervals, by fastening the inner peripheral ends of output disks 16 and the collars together with the fastening nut, which nut is screwed onto the output-shaft external screw-threaded portion from the left-hand axial end. The spacing structure mounted on output shaft 4 still further includes a pair of ball-and-cage assemblies located on the outer periphery of the collar and interposed between the two adjacent inner peripheral ends of output disks 16. In the shown embodiment, five pairs of ball-and-cage assemblies are provided for keeping respective outer peripheral edges of input disks 15 axially at regular intervals.

Of input-side concentric ridged portions 15a, 15b, 15c, 15d, 15e, 15f, and 15g formed on each input disk 15, the axial height of concentric ridged portion 15a is highest. Of output-side concentric ridged portions 16a, 16b, 16c, 16d, 16e, 16f, and 16g formed on each output disk 16, the axial height of concentric ridged portion 16a is highest. As can be seen from the cross section of FIG. 3, axial heights of input-side concentric ridged portions 15a, 15b, 15c, 15d, 15e, 15f, and 15g formed on each input disk 15 are dimensioned so that the outside ridged portion of the two adjacent input-side concentric ridged portions is lower than the inside ridged portion and thus the axial heights of input-side concentric ridged portions 15a-15g gradually lower toward the outer peripheral side of input disk 15. In a similar manner, axial heights of output-side concentric ridged portions 16a, 16b, 16c, 16d, 16e, 16f, and 16g formed on each output disk 16 are dimensioned so that the outside ridged portion of the two adjacent output-side concentric ridged portions is lower than the inside ridged portion and thus the axial heights of output-side concentric ridged portions 16a-16g gradually lower toward the outer peripheral side of output disk 16. That is, when contact pressure (two opposed contact forces having the same magnitude and the same line of action but different direction), applied to the outside faces of primary and secondary disk stacks 150 and 160 by the pressure roller pair 17, 17, is removed, with the aid of the previously-noted dimensional feature of axial heights of concentric input-side ridged portions 15a, 15b, 15c, 15d, 15e, 15f, and 15g and axial heights of output-side concentric ridged portions 16a, 16b, 16c, 16d, 16e, 16f, and 16g, which dimensional feature cooperates with the spacing structures mounted on input shaft 3 and output shaft 4, it is possible to ensure a clearance between the opposing apexes of input-side concentric ridged portion 15a and output-side concentric ridged portion 16g, a clearance between the opposing apexes of input-side concentric ridged portion 15b and output-side concentric ridged portion 16f, a clearance between the opposing apexes of input-side concentric ridged portion 15c and output-side concentric ridged portion 16e, a clearance between the opposing apexes of input-side concentric ridged portion 15d and output-side concentric ridged portion 16d, a clearance between the opposing apexes of input-side concentric ridged portion 15e and output-side concentric ridged portion 16c, a clearance between the opposing apexes of input-side concentric ridged portion 15f and output-side concentric ridged portion 16b, and a clearance between the opposing apexes of input-side concentric ridged portion 15g and output-side concentric ridged portion 16a.

As seen from the enlarged cross section of FIG. 5 and as described later in reference to the enlarged cross section of FIG. 14, the two opposing apexes 15' and 16' of two adjacent ridged portions (e.g., input-side concentric ridged portion 15e and output-side concentric ridged portion 16c), each of which apexes has a substantially triangular cross section, are formed as slightly sloped apexes, each having a contact angle "θ" that is axially down-sloped. The two opposing sloped apexes are pressed each other at the contact angle "θ".

Figure 5:
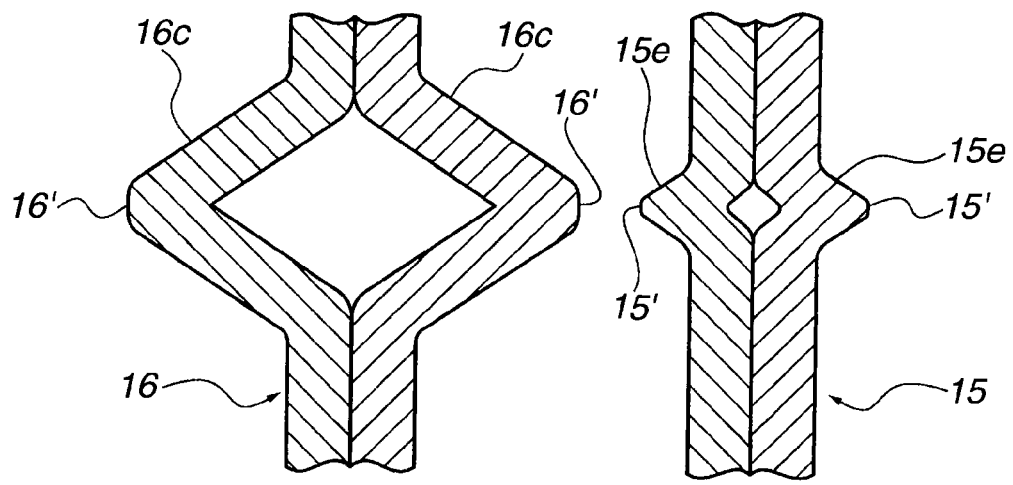
FIG. 5 is an enlarged cross section illustrating the detailed structure of the input and output disks of the multi-disk type multistage transmission unit of the embodiment, taken within the circular section C of FIG. 3.

As shown in FIG. 5, input disk 15 is constructed or formed by preparing two plates, each of which has input-side concentric ridged portion 15e having a substantially triangular cross section and formed on a first face of both faces, and by bonding the second faces (i.e., the backfaces) of the two plates together, while aligning input-side concentric ridged portions 15e, 15e of the two plates with each other. In a similar manner, as shown in FIG. 5, output disk 16 is constructed or formed by preparing two plates, each of which has output-side concentric ridged portion 16c having a substantially triangular cross section and formed on a first face of both faces, and by bonding the second faces (i.e., the backfaces) of the two plates together, while aligning output-side concentric ridged portions 16c, 16c of the two plates with each other. Each of input and output disks 15-16 is produced from a primarily machined plate formed with a plurality of concentric ridged portions, each having a substantially triangular cross section machined by press-working a plate material. For instance, a special alloy steel, having a superior wear and abrasion resistance and a high fatigue strength, may be used as a raw material for each of input and output disks 15-16. In order to maintain an oil film (a traction oil film) between the contacting surfaces of the two opposing apexes, lubricating-oil centrifugal lubrication or lubricating-oil flinging-up lubrication may be utilized for better lubricating-oil supply onto the contacting surfaces.

Figure 6:
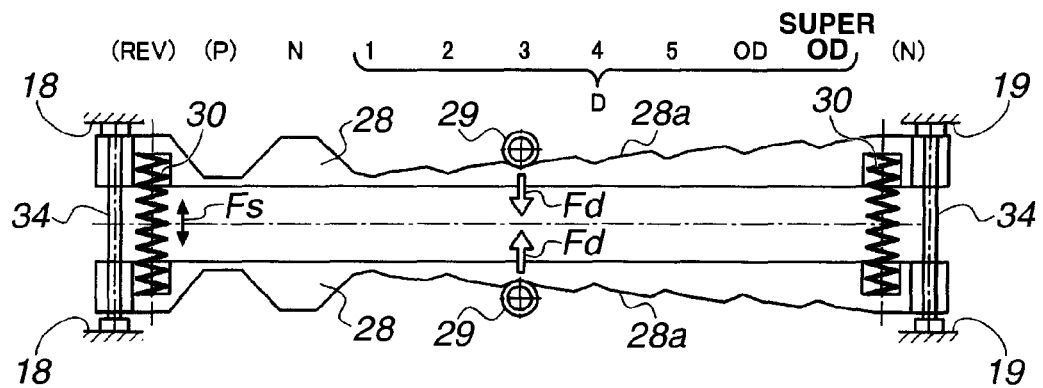
FIG. 6 is a top plan view illustrating a pair of biasing-force adjusting templates and a pair of cam followers, incorporated in the multi-disk type multistage transmission unit of the embodiment.
Figure 7A:
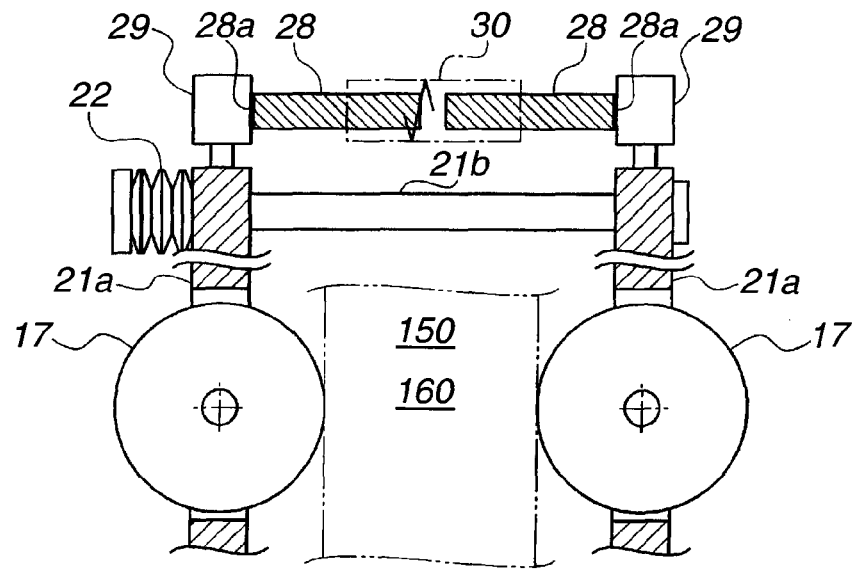
FIGS. 7A-7B are explanatory drawings illustrating biasing-force adjustments attained by the templates and cam followers, FIG. 7A showing a biasing-force removed state, whereas FIG. 7B showing a maximum biasing-force application state.
Figure 7B:
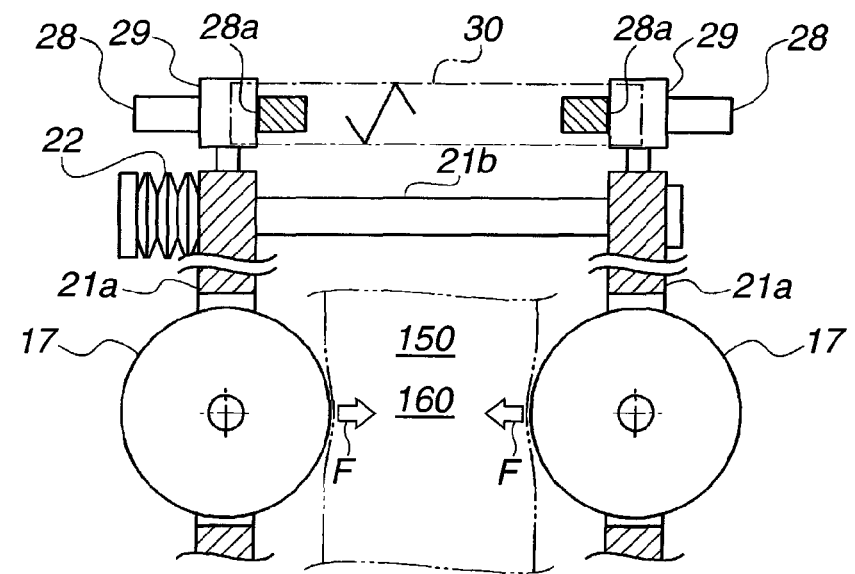

The construction (or the structure) of the biasing-force adjustment device for the pressure roller pair 17, 17 incorporated in multi-disk type multistage transmission unit T/U of the embodiment will be hereinafter described in detail by reference to the top plan view shown in FIG. 6 and illustrating the first template pair 28, 28 preloaded by the first coil spring pair 30, 30 and the first cam follower pair 29, 29 and the explanatory view of FIG. 7A illustrating biasing-force adjustment under the biasing-force removed state, and the explanatory view of FIG. 7B illustrating biasing-force adjustment under the maximum biasing-force application state.

As seen from the top plan view of FIG. 6, both ends of the template pair 28, 28 are movably supported by a first support pin 34 whose both ends are fixedly connected to respective input-shaft support frames 18, 18 and a second support pin 34 whose both ends are fixedly connected to respective output-shaft support frames 19, 19, in such a manner as to permit sliding movement of the template pair 28, 28 along the axes of the first and second support pins 34, 34. A first one of coil springs 30, 30 is interposed between the opposed left-hand ends (viewing FIG. 6) of the template pair 28, 28, and the second coil spring 30 is interposed between the opposed right-hand ends of the template pair 28, 28, so as to exert biasing force (spring force) Fs between the template pair 28, 28 in the direction that templates 28, 28 are forced apart from each other.

As can be seen in FIG. 6 and FIGS. 7A-7B, the cam follower pair 29, 29 is configured such that two opposed biasing forces Fd (having the same magnitude and the same line of action but different direction), produced by mechanical spring device 22 (coned disk spring), act on the contacting surfaces between the template cam-contour surface pair 28a, 28a and the cam follower pair 29, 29. Hence, biasing force F, applied to each of pressure rollers 17, 17, can be defined or regarded as a difference (Fd−Fs) between biasing force Fd produced by mechanical spring device 22 (coned disk spring) and biasing force Fs exerted between the template pair 28, 28 by the coil spring pair 30, 30. Biasing force F, applied to each of pressure rollers 17, 17, in other words, the biasing-force difference F (=Fd−Fs) between biasing forces Fd and Fs can be adjusted by properly setting the shape of each of cam contour surfaces 28a, 28a of the template pair 28, 28, thereby ensuring an appropriate magnitude of axial pressure (contact pressure) suited to a shifting condition.

The shapes of cam contour surfaces 28a, 28a of the template pair 28, 28 are set as follows.

First, when, in the top plan view of FIG. 6, the cam follower pair 29, 29 has been shifted into a REV (reverse) range position or into an N (neutral) range position, as shown in FIG. 7A the compressed amount (or the contracted amount) of coil spring 30 becomes maximum and thus biasing force Fs, produced by coil spring 30, also becomes maximum.

In contrast, when, in the top plan view of FIG. 6, the cam follower pair 29, 29 has been shifted into a P (parking) range position, as shown in FIG. 7B the entire length of coil spring 30, measured in the direction of the axis perpendicular to the end face of coil spring 30, i.e., the extended amount of coil spring 30, becomes maximum, and thus biasing force Fs, produced by coil spring 30, becomes minimum.

When, in the top plan view of FIG. 6, the cam follower pair 29, 29 is kept in either the 1st-speed, 2nd-speed, 3rd-speed, 4th-speed, 5th-speed, 6th-speed, or 7th-speed gear position within a D (drive) range, coil spring 30 can be compressed step-by-step, in accordance with a shift-stage change from the 1st-speed gear position (the lowest-speed shift stage) through the 2nd-speed gear position, the 3rd-speed gear position, the 4th-speed gear position, the 5th-speed gear position, and the 6th-speed gear position to the 7th-speed gear position (the highest-speed shift stage), in that order. Therefore, biasing force Fs, produced by coil spring 30, tends to increase in accordance with a shift-stage change from the 1st-speed gear position through the 2nd-speed, 3rd-speed, 4th-speed, 5th-speed, and 6th-speed gear positions to the 7th-speed gear position, in that order.

Additionally, the shapes of cam contour surfaces 28a, 28a are set or configured as follows. When the cam follower pair 29, 29 is kept in either the 1st-speed, 2nd-speed, 3rd-speed, 4th-speed, 5th-speed, 6th-speed, or 7th-speed gear position within the D (drive) range, and then a transition of the cam follower pair 29, 29 from one of the two adjacent speed gear positions (two consecutive shift stages) to the other (in other words, an upshift or a downshift of the transmission) occurs, coil spring 30 can be temporarily compressed. Therefore, the magnitude of biasing force Fs, produced by coil spring 30 during shifting, can be set to be greater than the magnitude of biasing force Fs, produced by coil spring 30 before and after shifting.

The operation and functions of multi-disk type multistage transmission unit T/U of the embodiment will be hereinafter described in detail by reference to the explanatory drawing of FIGS. 8-9, while classifying these operation and functions into seven topics, that is, [PRINCIPLE OF SHIFTING ATTAINED BY UTILIZING ELASTIC DEFORMATION OF DISKS], [ADVANTAGES OF MULTISTAGE TRANSMISSION CONFIGURED TO TRANSMIT DRIVING TORQUE VIA ELASTICALLY DEFORMABLE DISKS], [CLUTCH ACTION DURING SELECTION OF R RANGE], [PARKING ACTION DURING SELECTION OF P RANGE], [STARTING ACTION DURING N TO D RANGE SWITCHING], [AUTOMATIC SHIFTING ACTION DURING SELECTION OF D RANGE], and [ENHANCEMENT IN SHIFTING RESPONSE].

[Principle of Shifting Attained by Utilizing Elastic Deformation of Disks]

Figure 8:
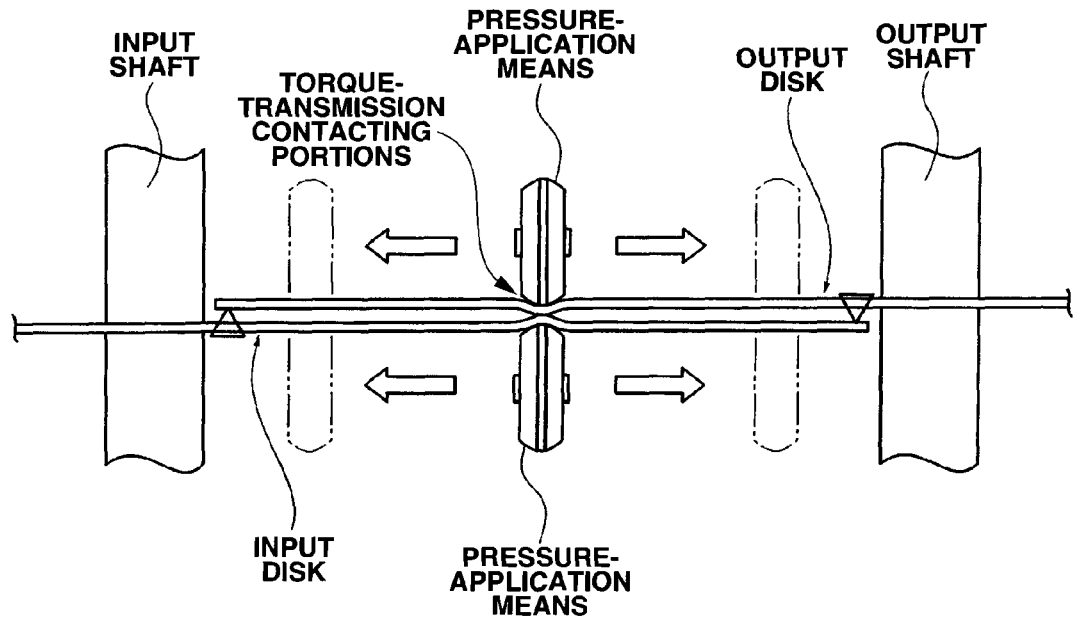
FIGS. 8-9 are explanatory drawings illustrating a principle of shifting attained by utilizing elastic deformation of the input and output disks of the multi-disk type multistage transmission unit of the embodiment, FIG. 8 being a plan view taken along the planes of the input and output disks, whereas FIG. 9 being a front elevation view in the direction perpendicular to the input and output disks.
Figure 9:
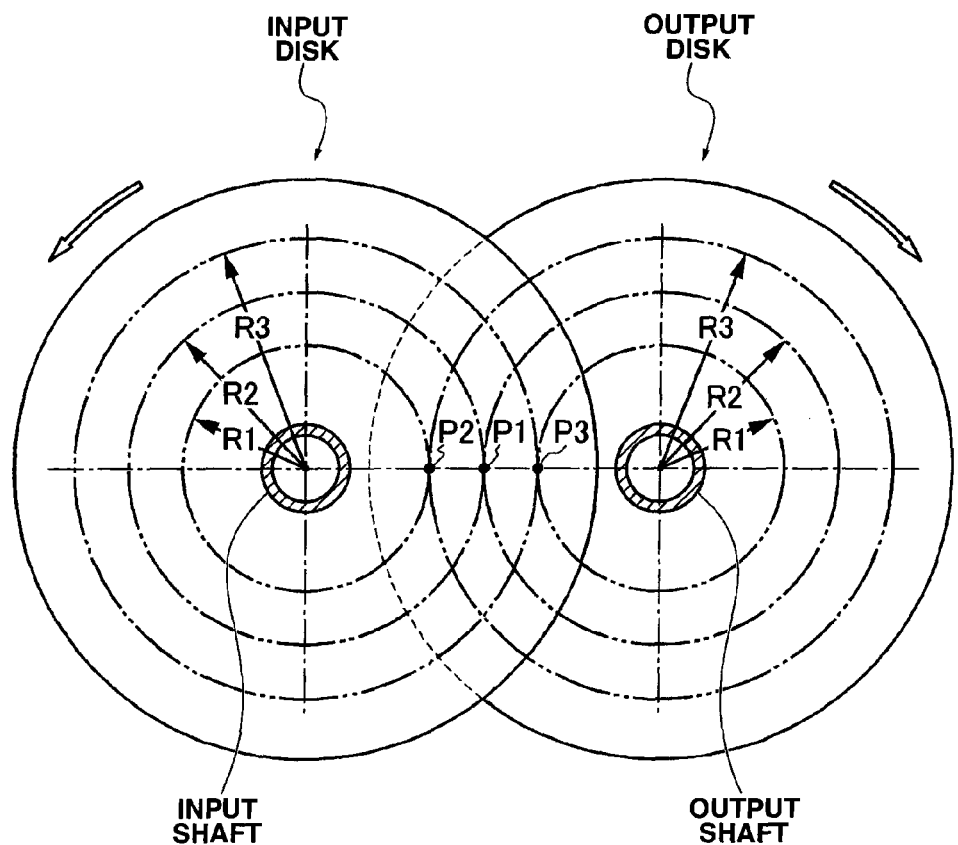

As can be seen from the explanatory drawings of FIGS. 8-9 illustrating the principle of shifting attained by utilizing elastic deformation of the input and output disks of multi-disk type multistage transmission unit T/U, for the purpose of simplification of the disclosure, suppose that, as a simple model of an automatic multistage transmission for explaining the shifting principle, the transmission is comprised of one input disk, which is installed on a transmission input shaft and whose outer peripheral edge is arranged in close proximity to a transmission output shaft, one output disk, which is installed on the transmission output shaft and whose outer peripheral edge is arranged in close proximity to the transmission input shaft, and a pair of pressure rollers (serving as pressure-application means). The pressure rollers are configured to be movable along a two-axes connecting line interconnecting two axes of the input and output shafts and perpendicular to both of the two axes within a disk overlapping area that the input and output disks overlap with each other. The pressure rollers are further configured to sandwich both outside faces of the input and output disks while applying contact pressure (two opposed contact forces) from the outside faces of the input and output disks at the position obtained as a result of a translating motion of the pressure roller pair 17, 17 along two-axes connecting line "CL" and corresponding to a required transmission ratio, for creating torque-transmission contacting portions by localized elastic deformation of both of the input and output disks.

As can be appreciated from the simplified transmission model shown in FIG. 8, when the outside faces of the input and output disks are sandwiched by the pressure roller pair, while applying contact pressure (two opposed contact forces) from their outside faces, the input and output disks can be locally deformed elastically, thereby creating a torque-transmission contacting portion. That is, the torque-transmission contacting portion between the input and output disks can be created or obtained by utilizing a principle that, when a concentrated load is applied to a simply-supported beam (or a simply-supported disk) whose both ends are supported, the locally loaded portion of the beam (the disk), to which the concentrated load is applied, tends to deform greatly.

For instance, when the torque-transmission contacting portion is created at a midpoint of the previously-discussed two-axes connecting line (see the intermediate position "P1" in FIG. 9), the radius R2 of an input-side osculating circle with the center, i.e., the axis of the input shaft (hereinafter referred to as "input-side driving radius") becomes identical to the radius R2 of an output-side osculating circle with the center, i.e., the axis of the output shaft (hereinafter referred to as "output-side driving radius"), so as to enable an equal speed ratio at which the speed ratio of the output-shaft rotational speed to the input-shaft rotational speed is "1".

When the torque-transmission contacting portion is created at a given position deviated from the midpoint of the previously-discussed two-axes connecting line toward the input-shaft side (see the position "P2" in FIG. 9), the input-side driving radius R1 becomes shorter than the output-side driving radius R3, in other words, the output-side driving radius R3 becomes longer than the input-side driving radius R1, so as to enable a speed reduction ratio (a low-speed transmission ratio) at which the speed ratio of the output-shaft rotational speed to the input-shaft rotational speed becomes less than "1".

Conversely when the torque-transmission contacting portion is created at a given position deviated from the midpoint of the previously-discussed two-axes connecting line toward the output-shaft side (see the position "P3" in FIG. 9), the input-side driving radius R3 becomes longer than the output-side driving radius R1, in other words, the output-side driving radius R1 becomes shorter than the input-side driving radius R3, so as to enable a speed increase ratio (a high-speed transmission ratio) at which the speed ratio of the output-shaft rotational speed to the input-shaft rotational speed becomes greater than "1".

[Advantages of Multistage Transmission Configured to Transmit Driving Torque Via Elastically Deformable Disks]

As discussed above, the multistage transmission of the embodiment can be regarded as a traction-drive multistage transmission configured to transmit driving torque through the elastically deformable disks. The multistage transmission of the embodiment can fulfill a shifting function of a higher degree of freedom for transmission-ratio settings, capable of achieving a wide range of speed ratios including a speed-increase ratio (an overdrive mode and/or a super-overdrive mode) as well as a speed-reduction ratio and an equal speed ratio. In addition to the above, the multistage transmission of the embodiment can fulfill a clutch function capable of switching from one of a torque-transmission enabling state and a torque-transmission disabling state to the other. Hence, it is possible to achieve low manufacturing costs and a more compact and light-weight friction-disk-drive construction. These advantages of the multistage transmission of the embodiment are hereunder described in detail.

(Shifting Function)

The multistage transmission of the embodiment can fulfill a shifting function having a higher degree of freedom for transmission-ratio settings, capable of achieving a wide range of speed ratios ranging from a speed-reduction ratio to a speed-increase ratio. For instance, the multistage transmission of the embodiment can realize a ratio coverage ranging from "8" to "11". In the shown embodiment, the transmission serves as a multistage transmission having a super-overdrive mode as well as an overdrive mode. As a matter of course, the multistage transmission fulfills a multistage shifting requirement, and thus improves fuel economy during high-speed driving of the vehicle. In particular, assume that the disk contacting point corresponding to the equal-speed-ratio position is shifted from the midpoint of the previously-discussed two-axes connecting line (i.e., the intermediate position "P1" in FIG. 9) toward the speed-increase side (e.g., the position "P3" in FIG. 9) by changing a final drive ratio of a final reduction gear. In such a case, it is possible to further increase the degree of freedom of transmission-ratio settings on the speed-reduction side. In the shown embodiment, the number of input disks 15 is "5", whereas the number of output disks 16 is "4". It will be appreciated that free settings of the number of input disks and the number of output disks enable a generalized design of a friction-disk-drive automatic transmission. Also, it is possible to simply properly increase a torque capacity of the transmission by increasing the number of disks.

(Clutch Function)

In the case of the multistage transmission of the embodiment, when contact pressure (two opposed contact forces), applied to the outside faces of the input and output disks by the pressure-application means (the pressure roller pair), is removed, the input and output disks recover their original flat-plate shapes/configurations by elastic recovery power. As a result of this, the torque-transmission contacting portion of the input and output disks, arising from the localized elastic deformation, disappears, and thus torque transfer from the input disk to the output disk is shut off (disabled). Conversely in the presence of application of contact pressure (two opposed contact forces) on the outside faces of the input and output disks by the pressure-application means (the pressure roller pair), torque transfer from the input disk to the output disk is permitted (enabled). That is, the multistage transmission of the embodiment can fulfill a clutch function.

For example, in the case of on-vehicle continuously variable transmissions (CVTs), such as a belt-drive continuously variable transmission, a toroidal continuously variable transmission and the like, torque-transmission contacting portions are permanently created between a primary power-transmission element (e.g., a belt-drive-CVT primary pulley or a toroidal-CVT input disc) and a secondary power-transmission element (e.g., a belt-drive-CVT secondary pulley or a toroidal-CVT output disc). Such CVTs, including a belt-drive CVT, a toroidal CVT, and the like, have only a shifting function without any clutch function. In order to ensure a neutral (N) state and to add a clutch function, a clutch device or a torque converter must be combined. In contrast, in the case of the multistage transmission of the embodiment, it is possible to eliminate additional clutch functional component parts.

(Low Manufacturing Costs, Light-Weight, Compactness)

According to the multistage transmission of the embodiment, two opposed contact forces, applied to both outside faces of the input and output disks, can be canceled each other at the torque-transmission contacting portion created by utilizing localized elastic deformation of both of the input and output disks. Thus, there is no load exerted on each of the input and output shafts owing to the contact forces. This eliminates the necessity of a high-rigidity supporting structure for each of the input and output shafts. This contributes to the reduced size and dimensions of input and output shafts, thus effectively enlarging the width of realized transmission ratios. Thus, each of the input and output disks can be produced by press-working a thin steel plate. Additionally, the multistage transmission unit of the embodiment is constructed simply by major components, namely, input and output shafts, input and output disks, and pressure-application means (the pressure roller pair). The multistage transmission of the embodiment is superior to the conventional "Beier" power transmission in simple construction and reduced component parts. Furthermore, the multistage transmission of the embodiment requires only a slight movable space needed for translating motion of the pressure-application means between the input and output shafts. Thus, the multistage transmission of the embodiment is superior to the conventional "Beier" power transmission in reduced movable spaces. Moreover, a primary disk stack, constructed by a plurality of input disks, and a secondary disk stack, constructed by a plurality of output disks, overlap with each other in order to provide a necessary disk overlapping area, and thus the entire length of the multistage transmission unit can be designed or set to a little over more than 1.5 times the disk diameter. This contributes to the compact multistage transmission unit, that allows excellent mountability. By synergistic effect of the previously-discussed several advantages, the multistage transmission of the embodiment is superior to generally-known transmissions as already mounted on automotive vehicles, in reduced manufacturing costs, light-weight, and compactness.

(Cooling and Lubricating Function)

The multistage transmission unit of the embodiment has a dual-axis structure comprised of the axis of input shaft 3 and the axis of output shaft 4. Additionally, the contact-pressure application point can be concentrated at the localized torque-transmission contacting portion of the input and output disks. Thus, it is possible to achieve an effective lubricating effect as well as a high cooling effect by locally spraying oil toward the localized torque-transmission contacting portion. Utilization of oil centrifugal lubrication or oil flinging-up lubrication eliminates the necessity of an oil pump.

[Clutch Action During Selection of R Range]

Figure 10:
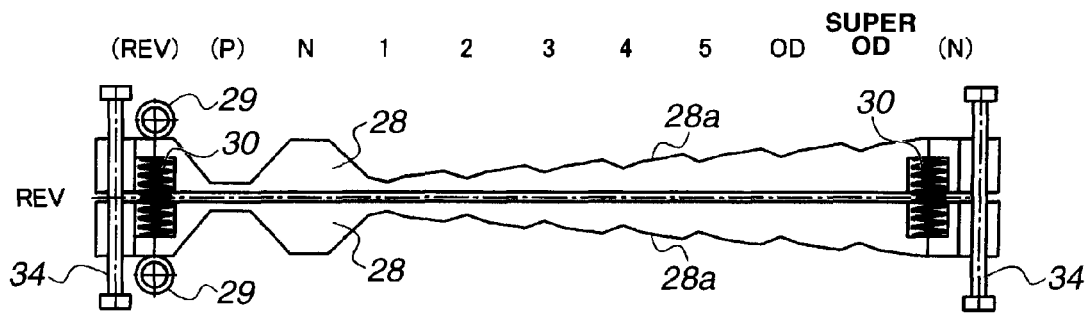
FIG. 10 is a top plan view illustrating the positional relationship between the template pair and the cam follower pair during R-range selection in the automotive automatic transmission system to which the multi-disk type multistage transmission unit of the embodiment can be applied.

Referring now to FIG. 10, there is shown the positional relationship between the template pair 28, 28 and the cam follower pair 29, 29 during the selection of the R range in the automotive automatic transmission system to which multi-disk type multistage transmission unit T/U of the embodiment can be applied.

During the selection of the R range in the automotive automatic transmission system, that is, at the backward vehicle-traveling mode, contact pressure (two opposed contact forces), applied to the outside faces of input and output disks 15-16 by the pressure roller pair 17, 17, is removed, so as to shut off torque transmission. Additionally, a coupling sleeve 8a of synchronizing device 8 is moved to the right (viewing FIG. 1) and as a result reverse gear 5 is drivingly connected to input shaft 3.

In more detail, during the selection of the R range, cam followers 29, 29 are held in cammed-connection with respective cam contour surfaces 28a, 28a of the template pair 28, 28 in the REV (reverse) range position shown in FIG. 10. With the cam follower pair 29, 29 held in the REV range position of the template pair 28, 28, the compressed amount of coil spring 30 becomes maximum and thus biasing force Fs, produced by coil spring 30, also becomes maximum. Under these conditions, biasing force Fs, produced by coil spring 30, becomes equal to or slightly greater than biasing force Fd, produced by mechanical spring device 22 (coned disk spring). Hence, biasing force F, applied to each of pressure rollers 17, 17, in other words, the biasing-force difference F (=Fd−Fs) between biasing forces Fd and Fs becomes approximately "0" (see FIG. 15). As a result of this, contact pressure (two opposed contact forces), applied to the outside faces of input and output disks 15-16 by the pressure roller pair 17, 17, becomes removed, so as to shut off torque transmission via multi-disk type multistage transmission unit T/U. That is, multi-disk type multistage transmission unit T/U of the embodiment can fulfill a clutch-disengagement function (or switching from a torque-transmission enabling state to a torque-transmission disabling state).

Therefore, in the system diagram of FIG. 1, during the selection of the R range, driving torque, produced by engine 1, is transmitted from input shaft 3 through synchronizing device 8, reverse gear 5, reverse idler gear 6, output gear 7, final gear 9, differential unit 10, and left and right axle driveshafts 11, 12 to left and right drive road wheels 13, 14, in that order, thus realizing a shift to reverse (exactly, a reverse-range 1st-speed gear position).

[Parking Action During Selection of P Range]

Figure 11:
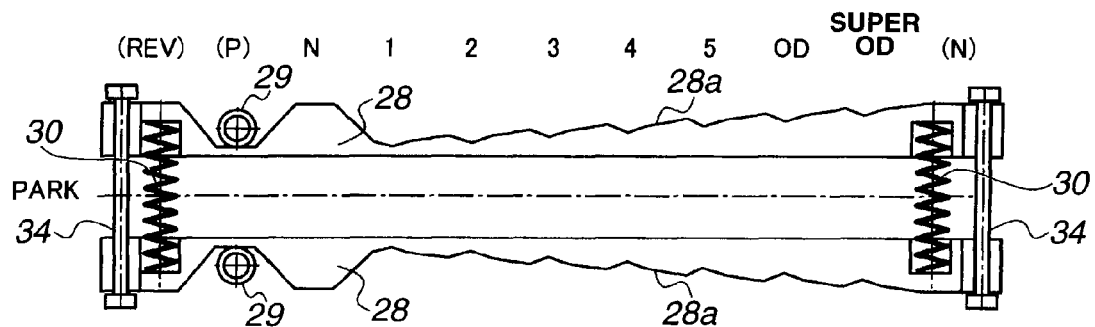
FIG. 11 is a top plan view illustrating the positional relationship between the template pair and the cam follower pair during P-range selection in the automotive automatic transmission system to which the multi-disk type multistage transmission unit of the embodiment can be applied.
Figure 12:
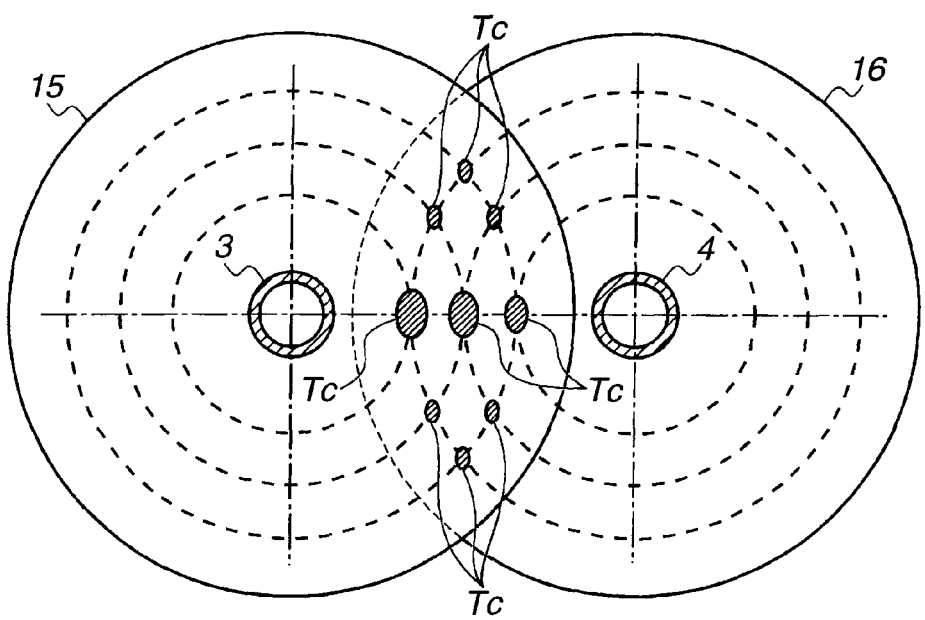
FIG. 12 is a front elevation view illustrating torque-transmission contacting portions (a plurality of friction-contact portions) on the input and output disks during P-range selection in the automotive automatic transmission system to which the multi-disk type multistage transmission unit of the embodiment can be applied.

Details of the parking action during the selection of the P range are hereunder described in reference to the explanatory views of FIGS. 11-12. FIG. 11 shows the positional relationship between the template pair 28, 28 and the cam-follower pair 29, 29 during the selection of the P range in the automotive automatic transmission system to which multi-disk type multistage transmission unit T/U of the embodiment can be applied. On the other hand, FIG. 12 shows a plurality of torque-transmission contacting portions (a plurality of friction-contact portions) created on the input and output disks during the selection of the P range in the automotive automatic transmission system to which multi-disk type multistage transmission unit T/U of the embodiment can be applied.

During the selection of the P range in the automotive automatic transmission system, that is, in the vehicle stopped state, input and output disks 15-16 are strongly engaged with each other, such that input and output disks 15-16 can be temporarily coupled with each other, so as to maintain the transmission in a locked state, thus holding output shaft 4 stationary. That is, multi-disk type multistage transmission unit T/U of the embodiment can fulfill a parking function.

In more detail, during the selection of the P range, cam followers 29, 29 are held in cammed-connection with respective cam contour surfaces 28a, 28a of the template pair 28, 28 in the P (parking) range position shown in FIG. 11. With the cam follower pair 29, 29 held in the P range position of the template pair 28, 28, the entire length of coil spring 30, measured in the direction of the axis perpendicular to the end face of coil spring 30, i.e., the extended amount of coil spring 30, becomes maximum and thus biasing force Fs, produced by coil spring 30, becomes minimum. Hence, biasing force F, applied to each of pressure rollers 17, 17, in other words, the biasing-force difference F (=Fd−Fs) between biasing forces Fd and Fs becomes maximum (see FIG. 15). Therefore, contact pressure (two opposed contact forces), applied to the outside faces of input and output disks 15-16 by the pressure roller pair 17, 17, becomes maximum, such that input and output disks 15-16 can be strongly engaged with each other by the maximum contact pressure (the maximum two opposed contact forces produced by the pressure roller pair 17, 17).

As seen in FIG. 12, the previously-discussed maximum contact pressure creates a plurality of torque-transmission contacting portions Tc at and around the position obtained as a result of translating motion of the movable pressure roller pair 17, 17 along two-axes connecting line "CL" and corresponding to the selected P range. Accordingly, input and output disks 15-16 are strongly engaged with each other and thus the transmission is kept in its locked state where relative rotation between input and output disks 15-16 cannot be permitted.

[Starting Action During N to D Range Switching]

Referring now to FIGS. 13A-13F, there are shown details of the positional relationship between the template pair 28, 28 and the cam follower pair 29, 29 in the presence of switching from N (neutral) to D (drive) range in the automotive automatic transmission system to which multi-disk type multistage transmission unit T/U of the embodiment can be applied. FIG. 13A shows the position of the cam follower pair relative to the template pair during the selection of the N range. FIG. 13B shows the position of the cam follower pair relative to the template pair during switching from N to D-range 1st-speed gear position. FIG. 13C shows the position of the cam follower pair relative to the template pair at full-load 1st-speed gear position. FIG. 13D shows the position of the cam follower pair relative to the template pair at light-load 1st-speed gear position. FIG. 13E shows the position of the cam follower pair relative to the template pair during switching from 1st-speed to 2nd-speed gear position. FIG. 13F shows the position of the cam follower pair relative to the template pair at 2nd-speed gear position.

During the selection of the N range in the automotive automatic transmission system, contact pressure (two opposed contact forces), applied to the outside faces of input and output disks 15-16 by the pressure roller pair 17, 17, of multi-disk type multistage transmission unit T/U is removed, so as to shut off torque transmission. Additionally, coupling sleeve 8a of synchronizing device 8 is moved to the left (viewing FIG. 1).

In more detail, during the selection of the N range, cam followers 29, 29 are held in cammed-connection with respective cam contour surfaces 28a, 28a of the template pair 28, 28 in the N (neutral) range position shown in FIG. 13A. With the cam follower pair 29, 29 held in the N range position of the template pair 28, 28, the compressed amount of coil spring 30 becomes maximum and thus biasing force Fs, produced by coil spring 30, also becomes maximum. Under these conditions, biasing force Fs, produced by coil spring 30, becomes slightly greater than biasing force Fd, produced by mechanical spring device 22 (coned disk spring). Hence, biasing force F, applied to each of pressure rollers 17, 17, in other words, the biasing-force difference F (=Fd−Fs) between biasing forces Fd and Fs becomes a negative value less than "0" (see FIG. 15). As a result of this, contact pressure (two opposed contact forces), applied to the outside faces of input and output disks 15-16 by the pressure roller pair 17, 17, becomes removed, thus ensuring a neutral (N) state where torque transmission via multi-disk type multistage transmission unit T/U is shut off.

Thereafter, when switching from N to D range occurs, that is, during a range transition from N to D range, as shown in FIG. 13B a movement (or a displacement) of the cam follower pair 29, 29, in rolling-contact with respective cam contour surfaces 28a, 28a of the template pair 28, 28, toward the D-range 1st-speed gear position, occurs. With the cam follower pair 29, 29 moving or displacing toward the D-range 1st-speed gear position of the template pair 28, 28, coil spring 30 tends to gradually lengthen and thus biasing force Fs, produced by coil spring 30, tends to gradually reduce. Hence, biasing force F, applied to each of pressure rollers 17, 17, in other words, the biasing-force difference F (=Fd−Fs) between biasing forces Fd and Fs tends to gradually increase. As a result of this, contact pressure (two opposed contact forces), applied to the outside faces of input and output disks 15-16 by the pressure roller pair 17, 17, also tends to gradually increase.

When it is determined, based on an opening of the accelerator conditioned within a high accelerator-opening range, that the engine is in a full-load state, cam followers 29, 29 can be brought into cammed-connection with respective cam contour surfaces 28a, 28a of the template pair 28, 28 at the full-load 1st-speed gear position shown in FIG. 13C. With the cam follower pair 29, 29 held at the full-load 1st-speed gear position of the template pair 28, 28, the entire length of coil spring 30, measured in the direction of the axis perpendicular to the end face of coil spring 30, i.e., the extended amount of coil spring 30, becomes maximum and thus biasing force Fs, produced by coil spring 30, becomes minimum. Hence, of all shift stages of the D range, at this full-load 1st-speed gear position (at full-load 1st-speed shift stage), biasing force F, applied to each of pressure rollers 17, 17, in other words, the biasing-force difference F (=Fd−Fs) between biasing forces Fd and Fs becomes maximum (see FIG. 15). Therefore, input and output disks 15-16 are sandwiched by the pressure roller pair 17, 17 with the maximum biasing force F substantially at a position (corresponding to the 1st-speed shift stage) where input-side concentric ridged portion 15a touches output-side concentric ridged portion 16g, while applying contact pressure (two opposed contact forces) from the outside faces of input and output disks 15-16. This enables full-load starting of the vehicle at a transmission ratio corresponding to the 1st-speed shift stage.

In contrast, when it is determined, based on an opening of the accelerator conditioned within a low accelerator-opening range, that the engine is in a light-load state, cam followers 29, 29 can be brought into cammed-connection with respective cam contour surfaces 28a, 28a of the template pair 28, 28 at the light-load 1st-speed gear position shown in FIG. 13D. With the cam follower pair 29, 29 held at the light-load 1st-speed gear position of the template pair 28, 28, the entire length of coil spring 30, measured in the direction of the axis perpendicular to the end face of coil spring 30, becomes a given length slightly shorter than that obtained at the full-load 1st-speed gear position, and thus biasing force Fs, produced by coil spring 30, becomes slightly greater than that obtained at the full-load 1st-speed gear position. Hence, of all shift stages of the D range, at this light-load 1st-speed gear position (at light-load 1st-speed shift stage), biasing force F, applied to each of pressure rollers 17, 17, in other words, the biasing-force difference F (=Fd−Fs) between biasing forces Fd and Fs becomes the second greatest magnitude in the D range (see FIG. 15). Therefore, input and output disks 15-16 are sandwiched by the pressure roller pair 17, 17 with the second greatest biasing force F substantially at a position (corresponding to the 1st-speed shift stage) where input-side concentric ridged portion 15a touches output-side concentric ridged portion 16g, while applying contact pressure (two opposed contact forces) from the outside faces of input and output disks 15-16. This enables light-load starting of the vehicle at a transmission ratio corresponding to the 1st-speed shift stage.

In the shown embodiment, regarding adjustment of biasing force F, suited to full load or light load, the biasing-force adjusting function is achieved by properly setting the shape of each of cam contour surfaces 28a, 28a of the template pair 28, 28. In lieu thereof, a spring-loaded loading cam mechanism, which can be operated responsively to a change in the magnitude of input torque from engine 1 to the transmission, may be combined. That is, adjustment of biasing force F, suited to a change in engine load, such as full load or light load, may be made by utilizing the operated amount of the loading cam.

[Automatic Shifting Action During Selection of D Range]

Figure 14:
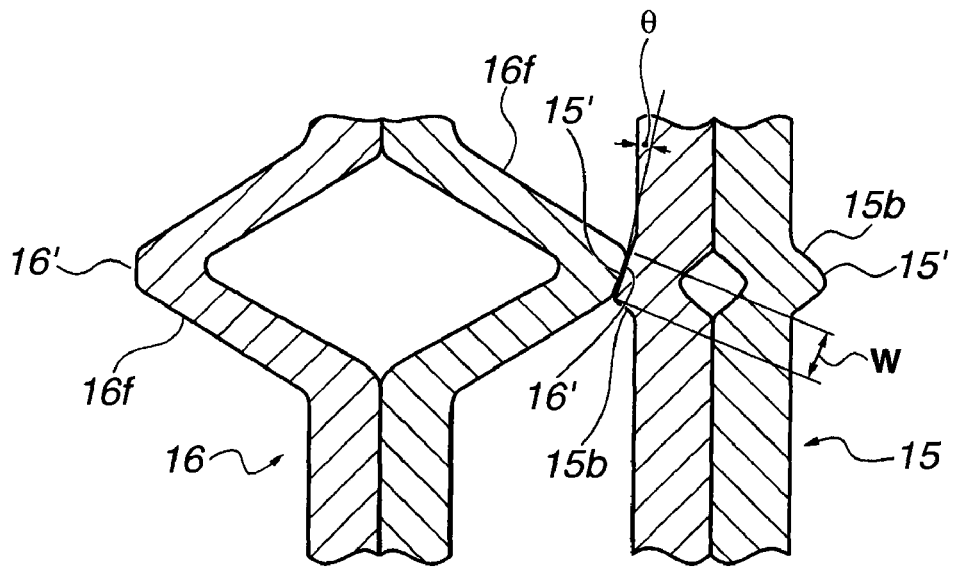
FIG. 14 is an enlarged cross section exaggeratedly illustrating a torque-transmission contacting portion on the input and output disks during D-range selection in the automotive automatic transmission system to which the multi-disk type multistage transmission unit of the embodiment can be applied.
Figure 15:
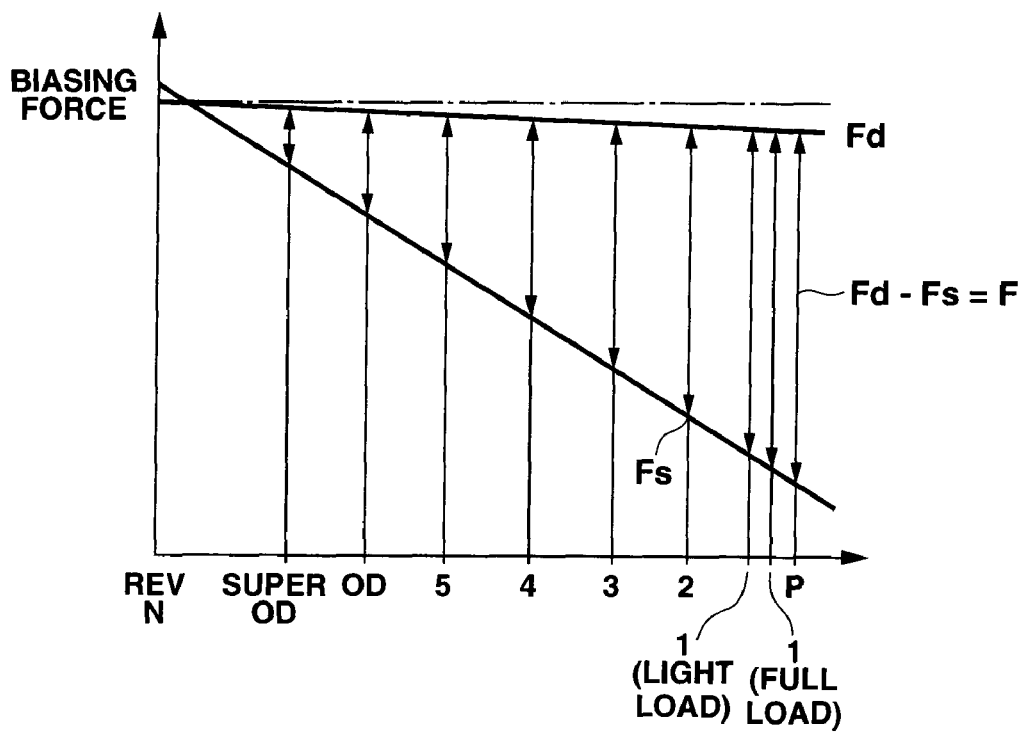
FIG. 15 is a biasing-force characteristic diagram illustrating variations in the difference $F$ ($=Fd-Fs$) between biasing forces $Fd$ and $Fs$ created at respective shift stages during D-range selection in the automotive automatic transmission system to which the multi-disk type multistage transmission unit of the embodiment can be applied.

Details of the automatic shifting action during the selection of the D range are hereunder described in reference to the explanatory views of FIGS. 14-15. FIG. 14 shows the enlarged cross section of the torque-transmission contacting portion on input and output disks 15-16 during the selection of the D range in the automotive automatic transmission system to which multi-disk type multistage transmission unit T/U of the embodiment can be applied. On the other hand, FIG. 15 shows the biasing-force characteristic diagram illustrating variations in biasing force F, applied to each of pressure rollers 17, 17, in other words, the biasing-force difference F (=Fd−Fs) between biasing forces Fd and Fs created at respective shift stages, namely, a full-load 1st-speed gear, a light-load 1st-speed gear, a 2nd-speed gear, a 3rd-speed gear, a 4th-speed gear, a 5th-speed gear, a 6th-speed gear (an overdrive), and a 7th-speed gear (a super-overdrive), during the selection of the D range in the automotive automatic transmission system to which multi-disk type multistage transmission unit T/U of the embodiment can be applied.

During the selection of the D range in the automotive automatic transmission system, that is, at the forward vehicle-traveling mode, in the system diagram of FIG. 1, driving torque, produced by engine 1, is transmitted from input shaft 3 through multi-disk type multistage transmission unit T/U, output shaft 4, output gear 7, final gear 9, differential unit 10, and left and right axle driveshafts 11, 12 to left and right drive road wheels 13, 14, in that order. At this time, it is possible to realize forward seven speeds (forward seven shift stages in the D range) by appropriately shifting the position (the point of contact-pressure application) of the movable pressure roller pair 17, 17 of multi-disk type multistage transmission unit T/U.

For instance, when a command concerning a 1-2 upshift from first to second is generated from a transmission controller (not shown) during forward traveling at the D range, as can be appreciated from the intermediate position of rotation-and-rightward-motion of the cam follower pair 29, 29 shown in FIG. 13E, the cam follower pair 29, 29 moves from the full-load 1st-speed gear position shown in FIG. 13C (or the light-load 1st-speed gear position shown in FIG. 13D) toward the 2nd-speed gear position shown in FIG. 13F. At this time, as the cam follower pair 29, 29 moves rightward (viewing FIG. 13E), the compressed amount of coil spring 30 tends to gradually increase and thus biasing force Fs, produced by coil spring 30, also tends to gradually increase. Hence, biasing force F, applied to each of pressure rollers 17, 17, in other words, the biasing-force difference F (=Fd−Fs) between biasing forces Fd and Fs tends to reduce. As a result of this, contact pressure (two opposed contact forces), applied to the outside faces of input and output disks 15-16 by the pressure roller pair 17, 17, tends to lower.

Thereafter, when cam followers 29, 29 are brought into cammed-connection with respective cam contour surfaces 28a, 28a of the template pair 28, 28 at the 2nd-speed gear position shown in FIG. 13F, the entire length of coil spring 30, measured in the direction of the axis perpendicular to the end face of coil spring 30, becomes a length slightly longer than that obtained during 1-2 upshifting shown in FIG. 13E. Hence, biasing force Fs, produced by coil spring 30 after completion of the 1-2 upshift, becomes smaller than that obtained during 1-2 upshifting shown in FIG. 13E. Hence, during 1-2 upshifting, the biasing-force difference F (=Fd−Fs) between biasing forces Fd and Fs can be temporarily suppressed to a properly small force. Immediately before the cam follower pair 29, 29 reaches the relative position to the template pair 28, 28, corresponding to the 2nd-speed gear position shown in FIG. 13F, the biasing-force difference F (=Fd−Fs) can be recovered again to a force greater than the previously-noted temporarily suppressed force. In this manner, input and output disks 15-16 are sandwiched by the pressure roller pair 17, 17 at a position (corresponding to the 2nd-speed shift stage) where input-side concentric ridged portion 15b touches output-side concentric ridged portion 16f, while applying contact pressure (two opposed contact forces) from the outside faces of input and output disks 15-16, thus realizing an upshift to second.

During forward traveling at the 2nd-speed shift stage, as can be seen from the enlarged cross section of FIG. 14, regarding input-side concentric ridged portion 15b and output-side concentric ridged portion 16f to which contact pressure (two opposed contact forces) is applied at the 2nd-speed shift stage, their opposing apexes 15' and 16', each having a substantially triangular cross section, can be brought into contact with each other by the two opposed contact forces. Hence, the contact width W of torque-transmission contacting portion Tc becomes a small value, such as 2 millimeters, and the shape of the contact area of the torque-transmission contacting portion becomes a substantially circular shape having a very small radius of contact. Generally, the wider the contact area, the greater the spin loss, occurring at torque-transmission contacting portion Tc. By virtue of the small contact width, an undesired spin loss in transmitted torque can be suppressed.

Furthermore, the two opposing apexes 15' and 16' of input-side concentric ridged portion 15b and output-side concentric ridged portion 16f, each of which apexes has a substantially triangular cross section, are formed as slightly sloped apexes, each having contact angle "θ" that is axially down-sloped. Thus, the two opposing apexes 15' and 16' are pressed each other at the contact angle "θ", such as 1.7 degrees, and therefore it is possible to efficiently transmit driving torque by virtue of such sloped wall contact at torque-transmission contacting portion Tc. This contributes to the high torque transmission efficiency.

Also in the presence of a 2-3 upshift, a 3-4 upshift, a 4-5 upshift, a 5-6 upshift from fifth speed to sixth speed (overdrive), or a 6-7 upshift from sixth speed to seventh speed (super-overdrive) during the selection of the D range, or also in the presence of a 7-6 downshift, a 6-5 downshift, a 5-4 downshift, a 4-3 downshift, a 3-2 downshift, or a 2-1 downshift during the selection of the D range, automatic shifting, similar to the previously-discussed automatic shifting action made during a 1-2 upshift, can be realized.

As described previously, when the cam follower pair 29, 29 is kept in either the 1st-speed, 2nd-speed, 3rd-speed, 4th-speed, 5th-speed, 6th-speed, or 7th-speed gear position within the D (drive) range, coil spring 30 can be compressed step-by-step, in accordance with a shift-stage change from the 1st-speed gear position (the lowest-speed shift stage) through the 2nd-speed gear position, the 3rd-speed gear position, the 4th-speed gear position, the 5th-speed gear position, and the 6th-speed gear position to the 7th-speed gear position (the highest-speed shift stage), in that order. That is, the shapes of cam contour surfaces 28a, 28a of the template pair 28, 28 are set or configured, such that biasing force Fs, produced by coil spring 30, increases in accordance with a shift-stage change from the 1st-speed gear position through the 2nd-speed, 3rd-speed, 4th-speed, 5th-speed, and 6th-speed gear positions to the 7th-speed gear position, in that order. By virtue of the previously-discussed setting of the shape of the template cam-contour surface pair 28a, 28a, as can be appreciated from the biasing-force characteristic diagram of FIG. 15, biasing force F, applied to each of pressure rollers 17, 17, in other words, the biasing-force difference F (=Fd−Fs) between biasing forces Fd and Fs becomes maximum during the selection of the full-load 1st-speed gear position, and tends to reduce step-by-step in accordance with a shift-stage change from the 2nd-speed gear position through the 3rd-speed, 4th-speed, 5th-speed, and 6th-speed gear positions to the 7th-speed gear position, in that order. Hence, the magnitude of transmitted torque at the 1st-speed shift stage becomes maximum, the magnitude of transmitted torque at the 7th-speed shift stage becomes minimum, and additionally multi-disk type multistage transmission unit T/U of the embodiment enables application of an appropriately controlled contact pressure (appropriate two opposed contact forces) that can create an appropriate contact area, which minimizes or suppresses a slippage, at torque-transmission contacting portion Tc corresponding to each shift stage from the 1st-speed gear position to the 7th-speed gear position.

Furthermore, as described previously, the shapes of cam contour surfaces 28a, 28a are set or configured as follows. When the cam follower pair 29, 29 is kept in either the 1st-speed, 2nd-speed, 3rd-speed, 4th-speed, 5th-speed, 6th-speed, or 7th-speed gear position within the D range, and then a transition of the cam follower pair 29, 29 from one of the two adjacent speed gear positions to the other (in other words, an upshift or a downshift of the transmission) occurs, coil spring 30 can be temporarily compressed, and thus the magnitude of biasing force Fs, produced by coil spring 30 during shifting, can be set to be greater than that before and after shifting. By virtue of the previously-discussed setting of the shape of the template cam-contour surface pair 28a, 28a, biasing force F, applied to each of pressure rollers 17, 17, in other words, the biasing-force difference F (=Fd−Fs) between biasing forces Fd and Fs, created during shifting, tends to become less than that before and after shifting. Hence, during an upshift from first to second or during a downshift from second to first, power (or torque), needed to move the pressure roller pair 17, 17, can be reduced. As a result, the load on actuator 23 (e.g., a stepping motor) can be reduced. This enables the use of a small-size stepping motor, and also enables a more smooth automatic shifting action, while utilizing the small-size actuator (the small-size stepping motor).

[Enhancement in Shifting Response]

Figure 16:
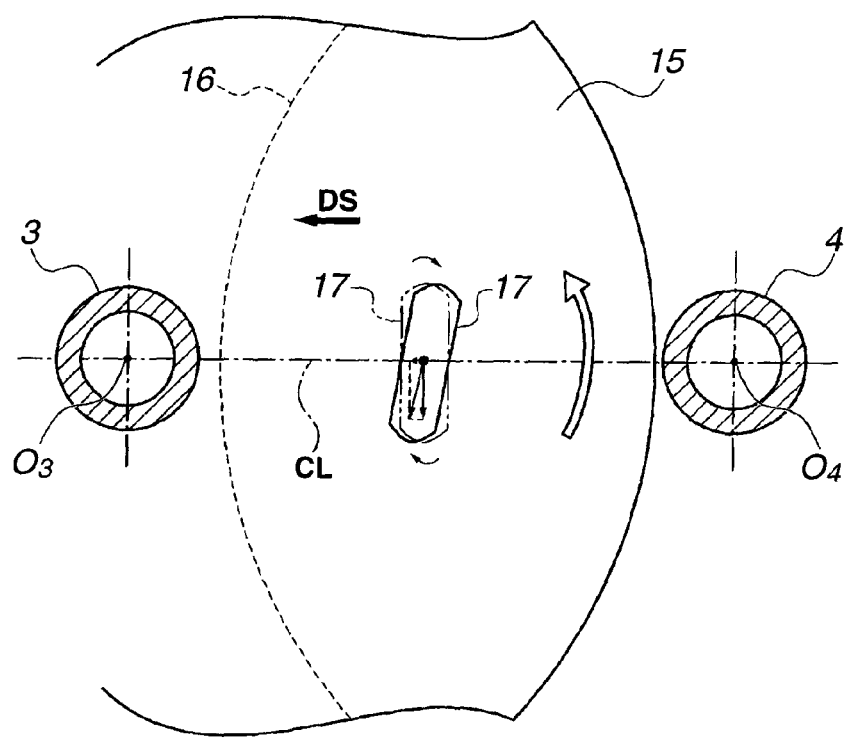
FIG. 16 is an explanatory drawing illustrating an infinitesimal steer arising from a downshift during vehicle traveling at the D range in the automotive automatic transmission system to which the multi-disk type multistage transmission unit of the embodiment can be applied.
Figure 17:
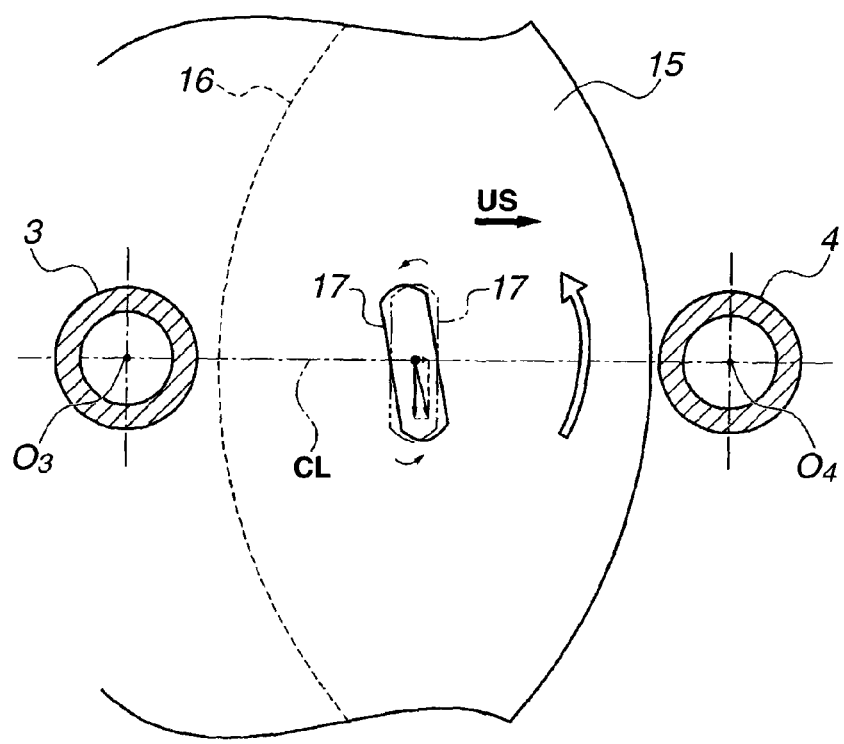
FIG. 17 is an explanatory drawing illustrating an infinitesimal steer arising from an upshift during vehicle traveling at the D range in the automotive automatic transmission system to which the multi-disk type multistage transmission unit of the embodiment can be applied.

Details of the enhanced shifting response during downshifting or during upshifting are hereunder described in reference to the explanatory views of FIGS. 16-17. FIG. 16 shows the explanatory drawing illustrating an infinitesimal steer arising from a downshift during vehicle traveling at the D range in the automotive automatic transmission system to which multi-disk type multistage transmission unit T/U of the embodiment can be applied. Conversely, FIG. 17 shows an explanatory drawing illustrating an infinitesimal steer arising from an upshift during vehicle traveling at the D range in the automotive automatic transmission system to which multi-disk type multistage transmission unit T/U of the embodiment can be applied. For the sake of simplicity in the following discussion, in the explanatory views of FIGS. 16-17, the tilting action of only one pressure roller 17 contacting the outside face of input disk 15 will be hereunder explained in detail.

In the shown embodiment, the pressure roller pair 17, 17 is configured and installed to permit the rotation axis of the pressure roller pair 17, 17, that is, the axis of each of pressure-roller pivots 20, 20 to be aligned with two-axes connecting line "CL" when there is no shift-stage change from the current shift stage and thus there is no occurrence of translating motion of the pressure roller pair 17, 17 along two-axes connecting line "CL". The pressure roller pair 17, 17 is further configured and installed to permit an infinitesimal tilting motion of the rotation axis of the pressure roller pair 17, 17 with respect to two-axes connecting line "CL", whose tilting direction depends on the direction of translating motion of the pressure roller pair 17, 17 along two-axes connecting line "CL" when there is a shift-stage change from the current shift stage.

Hence, during a downshift at the D-range traveling mode, as seen in FIG. 16, owing to leftward translating motion of pressure roller 17 as well as counterclockwise rotary motion of input disk 15 (viewing FIG. 16), pressure roller 17, which is in rolling-contact with the outside face of input disk 15, slightly tilts rightward from the initial attitude indicated by the two-dotted line (the phantom line) in FIG. 16 to the inclined attitude indicated by the solid line in FIG. 16, so as to exhibit an infinitesimal steer action. For this reason, the direction of a force vector created at the point of contact between pressure roller 17 and input disk 15 tends to slightly incline leftward with respect to the plane perpendicular to two-axes connecting line "CL". As a result of this, a component force, whose direction is identical to the downshifting direction indicated by character "DS" in FIG. 16, appears on two-axes connecting line "CL". The component force acts to accelerate the downshifting speed, thus enhancing the downshifting response.

Conversely, during an upshift at the D-range traveling mode, as seen in FIG. 17, owing to rightward translating motion of pressure roller 17 as well as counterclockwise rotary motion of input disk 15 (viewing FIG. 17), pressure roller 17, which is in rolling-contact with the outside face of input disk 15, slightly tilts leftward from the initial attitude indicated by the two-dotted line (the phantom line) in FIG. 17 to the inclined attitude indicated by the solid line in FIG. 17, so as to exhibit an infinitesimal steer action. For this reason, the direction of a force vector created at the point of contact between pressure roller 17 and input disk 15 tends to slightly incline rightward with respect to the plane perpendicular to two-axes connecting line "CL". As a result of this, a component force, whose direction is identical to the upshifting direction indicated by character "US" in FIG. 17, appears on two-axes connecting line "CL". The component force acts to accelerate the upshifting speed, thus enhancing the upshifting response.

With the aid of the previously-noted infinitesimal steer action of the pressure roller pair 17, 17, an upshift full stroke from the 1st-speed gear position to the 7th-speed gear position or a downshift full stroke from the 7th-speed gear position to the 1st-speed gear position can be completed within a time duration of less than one second. These shifting response test results were assured by the inventor of the present invention.

The effects of multi-disk type multistage transmission unit T/U of the embodiment are hereunder described in detail.

(1) Multi-disk type multistage transmission unit T/U of the embodiment includes input shaft 3 connected to a prime mover (engine 1) and supported by a transmission-case member (input-shaft support frames 18, 18), output shaft 4 arranged parallel to input shaft 3 and supported by the transmission-case member (output-shaft support frames 19, 19), input disk 15 which is installed on input shaft 3 and whose outer peripheral edge is arranged in close proximity to output shaft 4, output disk 16 which is installed on output shaft 4 and whose outer peripheral edge is arranged in close proximity to input shaft 3, and a pair of pressure-application devices (a pair of pressure rollers 17, 17) configured to be movable along two-axes connecting line "CL", interconnecting the axis "$O_3$" of input shaft 3 and the axis "$O_4$" of output shaft 4, within a disk overlapping area that input and output disks 15-16 overlap with each other, and further configured to sandwich both outside faces of input and output disks 15-16 while applying contact pressure (two opposed contact forces) from the outside disk faces at a position corresponding to a required transmission ratio, for creating a torque-transmission contacting portion Tc by elastic deformation of input and output disks 15-16. The previously-discussed input disk 15 has a plurality of input-side concentric ridged portions 15a, 15b, 15c, 15d, 15e, 15f, and 15g formed on its disk face and arranged concentrically with the axis "$O_3$" of input shaft 3 as concentric circles with the same center, which center is identical to the axis "$O_3$" of input shaft 3, and respective different radii from the axis "$O_3$". The previously-discussed output disk 16 has a plurality of output-side concentric ridged portions 16a, 16b, 16c, 16d, 16e, 16f, and 16g formed on its disk face and arranged concentrically with the axis "$O_4$" of output shaft 4 as concentric circles with the same center, which center is identical to the axis "$O_4$" of output shaft 4, and respective different radii from the axis "$O_4$". The previously-discussed plurality of input-side concentric ridged portions 15a-15g and the plurality of output-side concentric ridged portions 16a-16g are configured such that the entire length of two-axes connecting line "CL" is divided into an input-side driving radius and an output-side driving radius, both determined based on the required transmission ratio of a plurality of transmission ratios. Additionally, an apex of a selected one of the input-side concentric ridged portions 15a-15g, determined based on the required transmission ratio, and an apex of a selected one of the output-side concentric ridged portions 16a-16g, determined based on the required transmission ratio, are arranged to oppose each other on two-axes connecting line "CL". Hence, it is possible to fulfill (i) a shifting function having a higher degree of freedom for transmission-ratio settings enabling an upshift to a higher transmission ratio including a speed-increase ratio and (ii) a clutch function capable of switching from one of a torque-transmission enabling state and a torque-transmission disabling state to the other, while achieving reduced manufacturing costs, lightweight, and compactness. Additionally, by virtue of the narrow point of contact between the two opposed apexes, the shape of the contact area of the torque-transmission contacting portion becomes a substantially circular shape having a very small radius of contact, and therefore there is a less relative-velocity difference between the two contacting surfaces around the center of the torque-transmission contacting portion. This effectively suppresses undesired galling contact, thus reducing a spin loss in transmitted torque at a position corresponding to each of finite shift stages (finite transmission ratios).

(2) The previously-discussed input-side concentric ridged portions 15a, 15b, 15c, 15d, 15e, 15f, and 15g are dimensioned such that the axial height of concentric ridged portion 15a located nearest to input shaft 3 is highest and that the axial heights of input-side concentric ridged portions 15a-15g gradually lower toward the outer periphery of input disk 15. The previously-discussed output-side concentric ridged portions 16a, 16b, 16c, 16d, 16e, 16f, and 16g are dimensioned such that the axial height of concentric ridged portion 16a located nearest to output shaft 4 is highest and that the axial heights of output-side concentric ridged portions 16a-16g gradually lower toward the outer periphery of output disk 16. Hence, when the contact pressure (two opposed contact forces having the same magnitude and the same line of action but different direction), applied to the outside faces of input and output disks 15-16 by the pressure roller pair 17, 17, is removed, it is possible to ensure a clearance between the opposing apexes of the input-side concentric ridged portion and the output-side concentric ridged portion, thus reducing a friction loss caused by a drag.

(3) The previously-discussed two opposing apexes 15'-16' of the selected input-side concentric ridged portion of the plurality of input-side concentric ridged portions 15a-15g, determined based on the required transmission ratio, and the selected output-side concentric ridged portion of the plurality of output-side concentric ridged portions 16*a*-16*g*, determined based on the required transmission ratio, each of which apexes has a substantially triangular cross section, are formed as sloped apexes, each having a contact angle "θ" that is axially down-sloped. The two opposing sloped apexes are pressed each other at the contact angle "θ". Hence, regardless of each disk's individual flatness, by virtue of the substantially triangular cross section of each of the concentric ridged portions as well as elastic deformation of each of the disks, it is possible to stably realize almost the same shape of the contact area at the point of contact. Furthermore, by virtue of such sloped wall contact at torque-transmission contacting portion Tc, it is possible to efficiently transmit driving torque. This contributes to the high torque transmission efficiency.

(4) The previously-discussed input disk 15 is formed by preparing two plates, each of which has input-side concentric ridged portions 15*a*-15*g*, each having a substantially triangular cross section and formed on a first face of both faces, and by bonding the second faces (i.e., the backfaces) of the two plates together, while aligning the input-side concentric ridged portions of the two plates with each other. In a similar manner, as shown in FIG. 5, output disk 16 is formed by preparing two plates, each of which has output-side concentric ridged portions 16*a*-16*g*, each having a substantially triangular cross section and formed on a first face of both faces, and by bonding the second faces (i.e., the backfaces) of the two plates together, while aligning the output-side concentric ridged portions of the two plates with each other. Hence, by virtue of the triangular cross section of each of the ridged portions of input and output disks 15-16, it is possible to reconcile or balance two contradictory requirements, that is, high rigidity and light weight. Moreover, by virtue of the triangular cross section, it is possible to easily provide advantageous heat-radiating spaces. Such heat-radiating spaces can be utilized as heat-radiating resin charging spaces.

(5) Each of the previously-discussed input and output disks 15-16 is produced from a primarily machined plate formed with the plurality of concentric ridged portions, each having the substantially triangular cross section machined by press-working a plate material. Hence, it is possible to inexpensively manufacture each of input and output disks 15-16, each of which if formed with the plurality of concentric ridged portions, each having the substantially triangular cross section.

(6) The previously-discussed input shaft 3 is equipped with a primary disk stack 150 constructed by a plurality of input disks 15 axially arranged. The previously-discussed output shaft 4 is equipped with a secondary disk stack 160 constructed by a plurality of output disks 16 axially arranged. The previously-discussed pressure-application device pair (the pressure roller pair 17, 17) is configured to sandwich both side faces of primary and secondary disk stacks 150 and 160, while applying the contact pressure from the side faces of primary and secondary disk stacks 150 and 160 within a disk overlapping area within which primary and secondary disk stacks 150 and 160 overlap with each other and which is defined by interposing output disks 16 into respective axial clearance spaces defined by input disks 15 arranged adjacent to each other and axially spaced from each other. Hence, it is possible to easily realize a required transmitted torque capacity by appropriately setting both the number of input disks 15 and the number of output disks 16. Additionally, increasing the number of disks 15-16 contributes to a contact pressure reducing effect.

In the shown embodiment, multi-disk type multistage transmission unit T/U is exemplified in a multiple disk drive having primary disk stack 150 constructed by a plurality of input disks 15 and secondary disk stack 160 constructed by a plurality of output disks 16. In lieu thereof, another type of friction drive may be used. For instance, a single input-and-output disk drive, constructed by one input disk and one output disk (see the simple model of the transmission shown in FIGS. 8-9), may be used. Alternatively, double-input and single-output disk drive, constructed by two input disks and one output disk interposed between the input disks, may be used. Alternatively, single-input and double-output disk drive, constructed by two output disks and one input disk interposed between the output disks, may be used.

In the shown embodiment, the automatic transmission is exemplified in a seven-forward-speed multistage transmission wherein input disk 15 is formed with input-side concentric ridged portions 15*a*-15*g*, output disk 16 is formed with output-side concentric ridged portions 16*a*-16*g*, seven forward shift stages can be realized by applying the contact pressure at a selected one of stepwise pressure-application positions (stepwise points of contact), which selected position is obtained by moving the pressure roller pair 17, 17 in a stepwise manner. It will be appreciated that the fundamental concept of the invention can be applied to a multistage transmission except for the seven-forward-speed multistage transmission. For instance, it is possible to realize an eight or more forward-speed multistage transmission by increasing the number of the concentric ridged portions of each of input and output disks 15-16.

In the shown embodiment, as the pressure-application device pair (pressure-application means), pressure roller 17 is used. In lieu thereof, another type of pressure-application means, such as a pressure-application pin having a hemispherical contact surface formed at its tip or a pressure-application ball, may be used.

In the shown embodiment, the contact pressure, exerted via the pressure roller pair 17, 17, is created by the spring force of coned disk spring 22. Adjustment of the contact pressure is achieved in the form of a biasing-force difference (Fd−Fs) between biasing force Fd produced by coned disk spring 22 and biasing force Fs produced by coil spring 30, by means of the template pair 28, 28 and the cam follower pair 29, 29. Another type of contact-pressure adjustment device may be used. For instance, the contact pressure may be created by a hydraulic unit rather than mechanical spring devices. In more detail, a hydraulic pressure, produced by a hydraulic pressure source (an oil pump) is regulated by a hydraulic modulator (a hydraulic pressure control valve unit), and then the regulated hydraulic pressure may be utilized as an adjusted contact pressure.

In the shown embodiment, as a means by which movable frame 21 (in other words, a pressure-roller-pair carrier) is moved for upshifting or downshifting, a mechanical change-speed actuator (stepping motor 23) and a ball-screw motion-transmitting mechanism (ball-screw shaft 24, a movable ball nut and recirculating balls) are used. In lieu thereof, movement of movable frame 21 may be made by means of a hydraulic actuator.

INDUSTRIAL APPLICABILITY

In the shown embodiment, multi-disk type multistage transmission T/U is applied to an engine-equipped automotive vehicle that uses an internal combustion engine as a prime mover (a driving power source). As will be appreciated from the above, multi-disk type multistage transmission T/U may be used as a multistage transmission installed on another type of automotive vehicles, such as hybrid vehicles (HVs), electric vehicles (EVs), fuel cell powered vehicles (FCVs), and the like. Furthermore, multi-disk type multistage transmission T/U can be utilized for various types (various sizes) of automotive vehicles by changing the number of input and output disks depending on a required transmitted torque capacity. Instead of applying to automotive vehicles, multi-disk type multistage transmission T/U may be utilized as a multistage transmission installed on another equipments/apparatuses, such as construction equipments or air planes.

The entire contents of Japanese Patent Application Nos. 2008-224307 (filed Sep. 2, 2008), and 2008-221116 (filed Aug. 29, 2008) are incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A multistage transmission comprising:
   an input shaft connected to a prime mover, and supported by a transmission-case member;
   an output shaft arranged parallel to the input shaft and supported by the transmission-case member;
   an input disk which is installed on the input shaft and whose outer peripheral edge is arranged in close proximity to the output shaft;
   an output disk which is installed on the output shaft and whose outer peripheral edge is arranged in close proximity to the input shaft;
   a pair of pressure-application devices configured to be movable along a two-axes connecting line, interconnecting an axis of the input shaft and an axis of the output shaft, within a disk overlapping area that the input and output disks overlap with each other, and further configured to sandwich both outside faces of the input and output disks while applying contact pressure from the outside disk faces at a position corresponding to a required transmission ratio, for creating a torque-transmission contacting portion by elastic deformation of the input and output disks;
   the input disk having a plurality of input-side concentric ridged portions formed on its disk face and arranged concentrically with the axis of the input shaft as concentric circles with the same center, which center is identical to the axis of the input shaft, and respective different radii from the axis of the input shaft;
   the output disk having a plurality of output-side concentric ridged portions formed on its disk face and arranged concentrically with the axis of the output shaft as concentric circles with the same center, which center is identical to the axis of the output shaft, and respective different radii from the axis of the output shaft; and
   the plurality of input-side concentric ridged portions and the plurality of output-side concentric ridged portions being configured such that the entire length of the two-axes connecting line is divided into an input-side driving radius and an output-side driving radius, both determined based on the required transmission ratio of a plurality of transmission ratios, and that an apex of a selected one of the input-side concentric ridged portions, determined based on the required transmission ratio, and an apex of a selected one of the output-side concentric ridged portions, determined based on the required transmission ratio, are arranged to oppose each other on the two-axes connecting line.

2. The multistage transmission as claimed in claim 1, wherein:
   the input-side concentric ridged portions are dimensioned such that an axial height of the concentric ridged portion located nearest to the input shaft is highest and that the axial heights of the input-side concentric ridged portions gradually lower toward an outer periphery of the input disk; and
   the output-side concentric ridged portions are dimensioned such that an axial height of the concentric ridged portion located nearest to the output shaft is highest and that the axial heights of the output-side concentric ridged portions gradually lower toward an outer periphery of the output disk.

3. The multistage transmission as claimed in claim 1, wherein:
   the two opposing apexes of the selected input-side concentric ridged portion of the plurality of input-side concentric ridged portions, determined based on the required transmission ratio, and the selected output-side concentric ridged portion of the plurality of output-side concentric ridged portions, determined based on the required transmission ratio, each of which apexes has a substantially triangular cross section, are formed as sloped apexes, each having a contact angle that is axially down-sloped; and
   the two opposing sloped apexes are pressed each other at the contact angle.

4. The multistage transmission as claimed in claim 1, wherein:
   the input disk is formed by preparing two plates, each of which has the input-side concentric ridged portions, each having a substantially triangular cross section and formed on a first face of both faces, and by bonding the second faces of the two plates together, while aligning the input-side concentric ridged portions of the two plates with each other; and
   the output disk is formed by preparing two plates, each of which has the output-side concentric ridged portions, each having a substantially triangular cross section and formed on a first face of both faces, and by bonding the second faces of the two plates together, while aligning the output-side concentric ridged portions of the two plates with each other.

5. The multistage transmission as claimed in claim 4, wherein:
   each of the input and output disks is produced from a primarily machined plate formed with the plurality of concentric ridged portions, each having the substantially triangular cross section machined by press-working a plate material.

6. The multistage transmission as claimed in claim 1, wherein:
   the input shaft is equipped with a primary disk stack constructed by a plurality of input disks axially arranged;
   the output shaft is equipped with a secondary disk stack constructed by a plurality of output disks axially arranged; and
   the pressure-application device pair is configured to sandwich both side faces of the primary and secondary disk stacks, while applying the contact pressure from the side faces of the primary and secondary disk stacks within a disk overlapping area within which the primary and secondary disk stacks overlap with each other and which is defined by interposing the output disks into respective axial clearance spaces defined by the input disks arranged adjacent to each other and axially spaced from each other.

* * * * *